US011991223B2

(12) United States Patent
Zhang

(10) Patent No.: US 11,991,223 B2
(45) Date of Patent: May 21, 2024

(54) METHODS AND SYSTEMS FOR FACILITATING COMMUNICATION IN A COLLABORATIVE WORK ENVIRONMENT

(71) Applicant: Lemon Inc., Grand Cayman (KY)

(72) Inventor: Yuhui Zhang, Los Angeles, CA (US)

(73) Assignee: Lemon Inc., Grand Cayman (KY)

( * ) Notice: Subject to any disclaimer, the term of this patent is extended or adjusted under 35 U.S.C. 154(b) by 0 days.

(21) Appl. No.: 17/527,112

(22) Filed: Nov. 15, 2021

(65) Prior Publication Data
US 2023/0156052 A1 May 18, 2023

(51) Int. Cl.
*H04L 65/403* (2022.01)
*H04L 12/18* (2006.01)
*H04L 65/401* (2022.01)

(52) U.S. Cl.
CPC ...... *H04L 65/4015* (2013.01); *H04L 12/1818* (2013.01); *H04L 65/403* (2013.01)

(58) Field of Classification Search
None
See application file for complete search history.

(56) References Cited

U.S. PATENT DOCUMENTS

| | | | |
|---|---|---|---|
| 7,478,129 B1 | 1/2009 | Chemtob | |
| 9,773,228 B2 | 9/2017 | Baldwin et al. | |
| 11,175,806 B1* | 11/2021 | McCue | .............. G06F 3/0482 |
| 11,323,400 B1* | 5/2022 | Hu | ...................... H04L 63/0263 |
| 2006/0053380 A1* | 3/2006 | Spataro | .................. G06Q 10/10 |
| | | | 709/204 |
| 2009/0222741 A1* | 9/2009 | Shaw | ................... G06Q 10/109 |
| | | | 709/248 |

(Continued)

FOREIGN PATENT DOCUMENTS

KR 2019-0005137 A 1/2019

OTHER PUBLICATIONS

International Patent Application No. PCT/SG2022/050797; Int'l Search Report; dated Jul. 13, 2023; 6 pages.

(Continued)

*Primary Examiner* — Chris Parry
*Assistant Examiner* — Abderrahmen Chouat
(74) *Attorney, Agent, or Firm* — BakerHostetler

(57) ABSTRACT

The present disclosure describes techniques for facilitating a collaborative work communication environment. The techniques comprise maintaining in at least one database information about a plurality of virtual spaces via which a plurality of users share information; causing representations corresponding to the plurality of virtual spaces to be displayed on a first computing device associated with a first user; sending information associated with at least one virtual room among the plurality of virtual spaces to the first computing device, wherein the information comprises information indicative of at least one event; and causing at least one portion of the information indicative of the at least one event to be displayed in at least one representation corresponding to the at least one virtual space on the first computing, wherein the at least one portion of the information comprises at least one of a time associated with the at least one event, information about users associated with the at least one virtual space, or information about at least one sub-channel associated with the at least one virtual space.

20 Claims, 26 Drawing Sheets

(56) References Cited

U.S. PATENT DOCUMENTS

2018/0123814 A1* 5/2018 Sexauer .............. H04L 12/1818
2021/0295725 A1   9/2021 Jaeh et al.
2022/0337537 A1  10/2022 Lewis et al.

OTHER PUBLICATIONS

Withee et al.; "How to Use Microsoft Teams"; https://www.dummies.com/article/technology/software/microsoft-products/general-microsoft/how-to-use-microsoft-teams-259020/; Microsoft; Oct. 2021; accessed Sep. 26, 2023; 11 pages.

* cited by examiner

1200

Maintain, in at least one database, data associated with a plurality of users and data associated with at least one virtual space, wherein the plurality of users and the at least one virtual space are associated with a collaborative work environment, at least one subset of the plurality of users share information via the at least one virtual space, and the data associated with the plurality of users comprise data associated with a plurality of profiles corresponding to the plurality of users 1202

Receive data indicative of an update to a first profile among the plurality of profiles corresponding to a first user among the plurality of users, wherein the data indicative of the update comprises information identifying the at least one virtual space 1204

Automatically update the first profile based on the data indicative of the update, and automatically add to the at least one virtual space information corresponding to the data indicative of the update 1206

Maintain, in at least one database, data associated with a plurality of users and data associated with at least one virtual space, wherein at least one subset of the plurality of users share information via the at least one virtual space, and the data associated with the plurality of users comprise data associated with a plurality of profiles corresponding to the plurality of users 1302

Receive data indicative of an update to a first profile among the plurality of profiles corresponding to a first user among the plurality of users, wherein the data indicative of the update comprises information identifying the at least one virtual space 1304

Automatically update the first profile based on the data indicative of the update, and automatically adding information corresponding to the data indicative of the update to the at least one group 1306

Receive information sent from a second user to the first user, wherein the information sent from the second user to the first user comprises information identifying the first user 1308 automatically update the first profile corresponding to the first user based on the information sent from the second user to the first user, and automatically adding to the at least one virtual space the information sent from the second user to the first user 1310

Maintain in at least one database information about a plurality of virtual spaces, wherein a plurality of users share information via the plurality of virtual spaces, and wherein the plurality of users and the plurality of virtual spaces are associated with the collaborative work environment 2102 sending information associated with at least one virtual room among the plurality of virtual spaces to the first computing device, wherein the information comprises information indicative of at least one event 2104

Cause representations corresponding to the plurality of virtual spaces to be displayed on a first computing device associated with the first user 2106

Cause at least one portion of the information indicative of the at least one event to be displayed in at least one representation corresponding to the at least one virtual space on the first computing, wherein the at least one portion of the information comprises at least a time associated with the at least one event 2108

```
┌─────────────────────────────────────────────────────────────┐
│ Maintain in at least one database information about a       │
│ plurality of virtual spaces, wherein the information        │
│ comprises a description of at least a first event           │
│ associated with at least one of the plurality of virtual    │
│ spaces and a time associated with the first event 2402      │
└─────────────────────────────────────────────────────────────┘
```

```
┌─────────────────────────────────────────────────────────────┐
│ Send information associated with the at least one of the    │
│ virtual spaces to a first user, wherein the information     │
│ comprises information indicative of at least one            │
│ first event 2404                                            │
└─────────────────────────────────────────────────────────────┘
```

```
┌─────────────────────────────────────────────────────────────┐
│ Cause representations corresponding to the plurality of     │
│ virtual spaces to be displayed on a first computing device  │
│ associated with the first user 2406                         │
└─────────────────────────────────────────────────────────────┘
```

```
┌─────────────────────────────────────────────────────────────┐
│ Cause at least a portion of the information indicative of   │
│ the at least one event to be displayed on the first         │
│ computing, wherein the at least a portion for information   │
│ comprises at least the time associated with the at least    │
│ one event 2408                                              │
└─────────────────────────────────────────────────────────────┘
```

```
┌─────────────────────────────────────────────────────────────┐
│ Receive an indication from a second user to subscribe to    │
│ the at least one of the virtual spaces 2410                 │
└─────────────────────────────────────────────────────────────┘
```

```
┌─────────────────────────────────────────────────────────────┐
│ Send an indication to the second user after another event   │
│ is added to the calendar of the at least one of the         │
│ virtual spaces 2412                                         │
└─────────────────────────────────────────────────────────────┘
```

FIG. 24

METHODS AND SYSTEMS FOR FACILITATING COMMUNICATION IN A COLLABORATIVE WORK ENVIRONMENT

BACKGROUND

Communication is increasingly being conducted using Internet-based tools. The Internet-based tools may be any software or platform. Existing communication platforms enable users to communicate with each other by sharing text, images, videos, and other information via app or web pages. People continue to desire new ways for communication via Internet-based tools.

BRIEF DESCRIPTION OF THE DRAWINGS

The following detailed description may be better understood when read in conjunction with the appended drawings. For the purposes of illustration, there are shown in the drawings example embodiments of various aspects of the disclosure; however, the invention is not limited to the specific methods and instrumentalities disclosed.

FIG. 12 shows an example process for facilitating communication, which may be performed by a communication system in accordance with the present disclosure.

FIG. 13 shows an example process for facilitating communication, which may be performed by a communication system in accordance with the present disclosure.

FIG. 21 shows an example process for facilitating communication, which may be performed by a communication system in accordance with the present disclosure.

FIG. 24 shows an example process for facilitating communication, which may be performed by a communication system in accordance with the present disclosure.

DETAILED DESCRIPTION OF ILLUSTRATIVE EMBODIMENTS

Existing internet-based communication tools may facilitate communication between two or more people, such as two or more co-workers. For example, existing internet-based communication tools may facilitate a video conference between two or more people. Likewise, existing internet-based communication tools may facilitate a text messaging and/or instant messaging exchange between two or more people.

However, such existing internet-based communication tools have shortcomings. These shortcomings result in a less than ideal user experience. First, existing internet-based communication tools do not disseminate information to as broad an audience as possible. Accordingly, many users of such internet-based communication tools may need to spend additional time disseminating the same information via multiple different internet-based communication tools in order to reach all of the desired audience. Second, existing internet-based communication tools do not provide a means for users to view all upcoming events or meetings schedule by other users. For example, existing internet-based communication tools may only show a user those events or meetings that the user has been invited to or has created (such as via a virtual calendar associated with the user), but the user may not be able to see any activity associated with other upcoming or previous events or meetings. As a result, users of existing internet-based communication tools may miss important opportunities to connect with or communicate with the other users.

Figure 1:
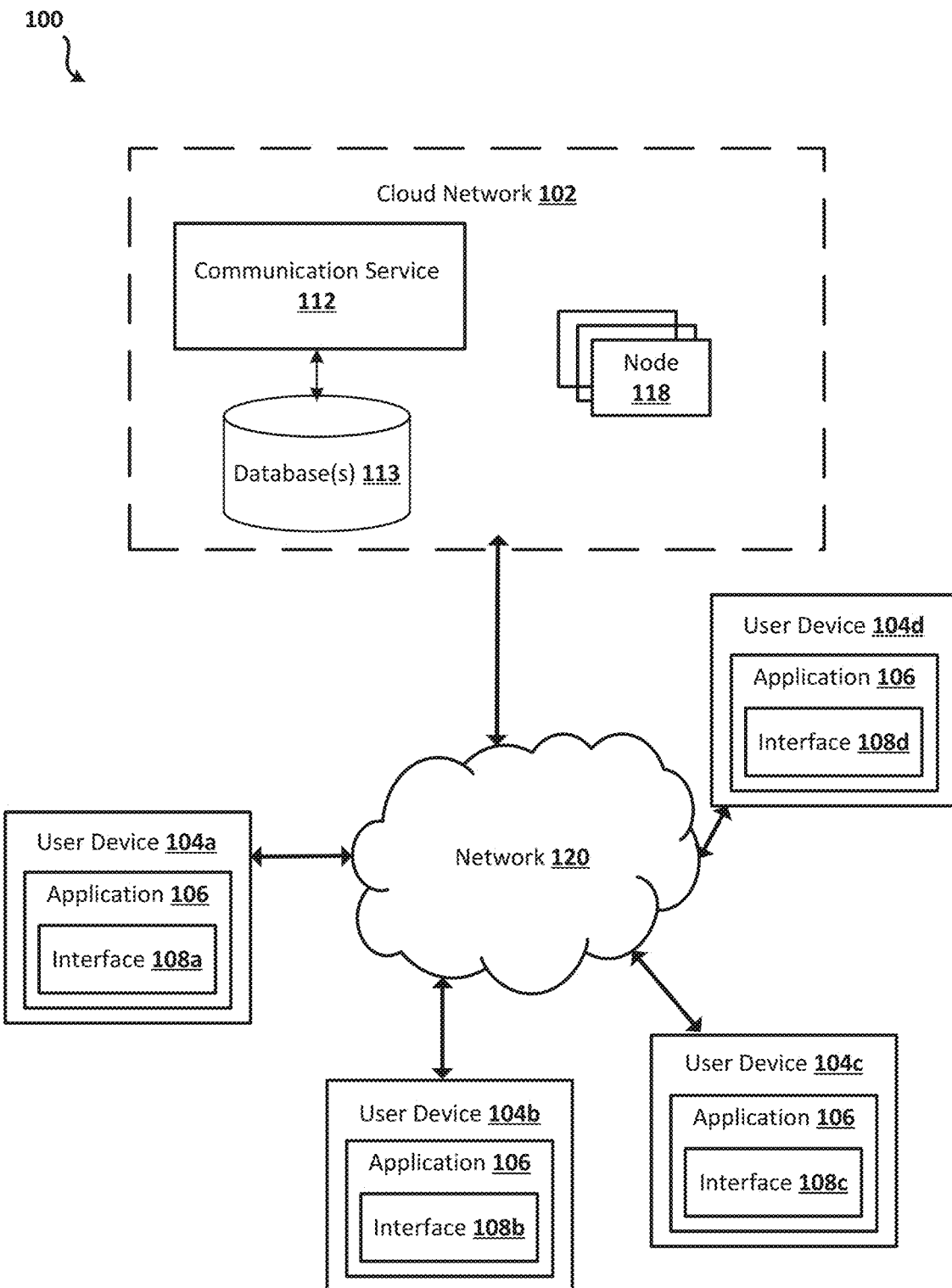
FIG. 1 shows an example system for facilitating communication in accordance with the present disclosure.

An improved internet-based communication tool is described herein. Such an improved internet-based communication tool addresses the shortcomings of existing internet-based communication tools and fosters a collaborative work communication environment. First, the internet-based communication tool described herein facilitates the dissemination of information to a broader audience than other internet-based communication tools are able to. Second, the internet-based communication tool described herein provides its users with a better overview of activity associated with upcoming or previous events or meetings. Such an improved internet-based communication tool may be utilized as a part of the example system 100 illustrated in FIG. 1. The system 100 may comprise a cloud network 102 and a plurality of user devices 104a-d. The cloud network 102 and the plurality of user devices 104a-d may communicate with each other via one or more networks 120.

The cloud network 102 may be located at a data center, such as a single premise, or be distributed throughout different geographic locations (e.g., at several premises). The cloud network 102 may provide the services via the one or more networks 120. The network 120 may comprise a variety of network devices, such as routers, switches, multiplexers, hubs, modems, bridges, repeaters, firewalls, proxy devices, and/or the like. The network 120 may comprise physical links, such as coaxial cable links, twisted pair cable links, fiber optic links, a combination thereof, and/or the like. The network 120 may comprise wireless links, such as cellular links, satellite links, Wi-Fi links and/or the like.

The cloud network 102 may comprise a plurality of computing nodes 118 that host a variety of services. In an embodiment, the nodes 118 host a communication service 112. The plurality of computing nodes 118 may process tasks associated with the communication service 112.

The plurality of computing nodes 118 may be implemented as one or more computing devices, one or more processors, one or more virtual computing instances, a combination thereof, and/or the like. The plurality of computing nodes 118 may be implemented by one or more computing devices. The one or more computing devices may comprise virtualized computing instances. The virtualized computing instances may comprise a virtual machine, such as an emulation of a computer system, operating system, server, and/or the like. A virtual machine may be loaded by a computing device based on a virtual image and/or other data defining specific software (e.g., operating systems, specialized applications, servers) for emulation. Different virtual machines may be loaded and/or terminated on the one or more computing devices as the demand for different types of processing services changes. A hypervisor may be implemented to manage the use of different virtual machines on the same computing device.

In an embodiment, the communication service 112 facilitates communication (e.g., synchronous communication and asynchronous communication) between users associated with the plurality of user devices 104a-d. The communication service 112 is discussed below in more detail with regard to FIG. 2.

In an embodiment, the plurality of user devices 104 are configured to access the communication service 112. For example, one or more of the user devices 104 may send, to the communication service 112, a connection request. The connection requests may comprise requests from the user devices 104a-d to connect to the communication service 112.

A user device 104a-d may comprise an application 106. The application 106 outputs (e.g., display, render, present) user interface(s) of the communication service 112 via an interface 108a-d. The users associated with the user devices 104a-d may interact with the user interface(s) of the communication service 112 to communicate with and/or build relationships with the other users of the communication service 112. For example, the user associated with the user device 104a may interact with the user interface(s) of the communication service 112 to communicate with and/or build relationships with one or more of the users associated with the user devices 104b-d.

The plurality of user devices 104 may comprise any type of computing device, such as a mobile device, a tablet device, laptop, a desktop computer, a smart television or other smart device (e.g., smart watch, smart speaker, smart glasses, smart helmet), a gaming device, a set top box, digital streaming device, robot, and/or the like.

The plurality of user devices 104 may be associated with one or more users. For example, the one or more users may be co-workers or colleagues. As another example, the one or more users may be friends, students, or any other group of people that want to or need to communicate with one another. A single user may use one or more of the user devices 104 to access the cloud network 102. The plurality of user devices 104 may travel to a variety of locations and use different networks to access the cloud network 102.

The communication service 112 may be configured to store data associated with the communication service 112, such as in one or more databases 113. The one or more databases 113 may be configured to store data associated with the users of the communication service 112, data associated with virtual space(s) for communication provided by the communication service 112, and/or data associated with past, current, or future scheduled communication amongst the users of the communication service 112. The one or more databases 113 and the data stored within the one or more databases 113 are discussed below in more detail with regard to FIG. 2.

Figure 2:
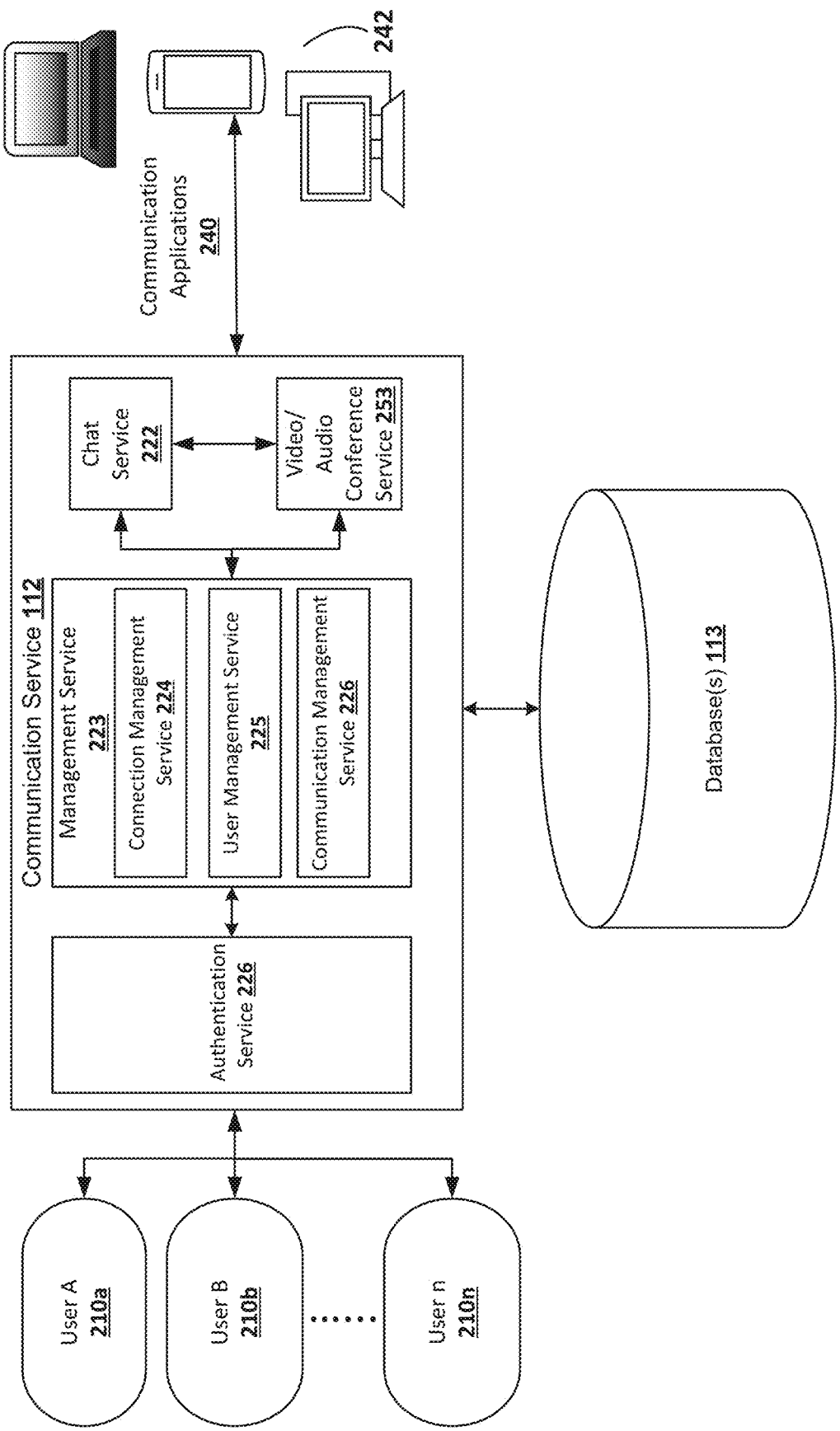
FIG. 2 shows an example system for facilitating communication in accordance with the present disclosure.

FIG. 2 shows an example system 200 for communication. The system 200 includes the communication service 112 described above with regard to FIG. 1. By way of example and without limitation, the communication service 112 may run on the cloud network 102 in FIG. 1. The communication service 112 may include a combination of cloud network devices and local devices. The communication service 112 may facilitate communication amongst the users 210a-n.

The communication service 112 may include an authentication service 226. The authentication service 226 may authorize and verify access to the other services provided by the communication service 112. The authentication service 226 may grant users access to the communication service 112. For instance, the authentication service 226 may receive connection requests from the users 210a-n. The connection requests may be requests to connect to the communication service 226. The authentication service 226 may, in response to such connection requests, grant or deny access to users.

The communication service 112 may include a management service 223. The management service 223 may manage communication amongst users 210a-n that have been connected to the communication service 112. For example, the management service 223 may manage communication amongst users 210a-n that have been granted access to the communication service 112 by the authentication service 226. The management service 223 may include a connection management service 224, a user management service 225, and/or a communication management service 226.

In an embodiment, the communication service 112 provides a plurality of virtual spaces to the users 210a-n. Each of the plurality of virtual spaces may be a virtual object that allows users 210a-n to associate with it to exchange information that is stored in association with the virtual space. Each virtual space enables users who associate with the virtual space to communicate in real time, non-real time etc., with other users associated with the virtual space. One or more of the virtual spaces may also enable certain communications from unassociated users to be communicated with internal users. A user 210a-n may join one virtual space at a time, or multiple virtual spaces at a time. At any given time, zero, one, or multiple users may be present in any given virtual space.

Each virtual space may be implemented as a data structure and one or more software functions that track users, permissions, any data that is exchanged between users 210a-n, and time association(s) of when users 210a-n associate (join the virtual space) and disassociate (leave the virtual space). In certain embodiments, each virtual space is associated with a calendar that indicates events or meetings associated with that virtual space.

In embodiments, any user that has joined a virtual space, would have the ability to review the history of communications that occurred in the virtual space. For example, a user that joined a virtual space at a time A could peruse the history of communications that occurred in that virtual space before time A, and from that gain an understanding of the development of the communication within the virtual space over time without the need to review an archive that would otherwise lack context. In that sense, the virtual space becomes a way of organizing an information exchange while preserving the historical context around particular items of communication.

In embodiments, each of the virtual spaces may be associated with a particular topic. The users 210a-n may associate themselves with a virtual space that is associated with a topic of interest. Within each virtual space, the users 210a-n that have joined that virtual space can communicate with each other, such as about the topic associated with that virtual space.

In embodiments, the users 210a-n may need permission to join one or more of the virtual spaces from the plurality of virtual spaces. For example, the users 210a-n may need to be given access to join a particular virtual space, such as by an administrator associated with the virtual space. The users 210a-n may need permission to join some of the virtual spaces of the plurality of virtual spaces, while other virtual spaces of the plurality of spaces may be open to any user 210a-n to join (without requiring permission or authentication). In some embodiments, the users 210a-n do not need permission to join any of the virtual spaces from the plurality of spaces. Instead, the users 210a-n may freely join and leave the virtual spaces.

In embodiments, the users 210a-n may be required to "check-in" to a virtual space in order to participate in real-time communication within the virtual space. For example, the user may decide that he or she wants to participate in real-time communication in a virtual space. The user may check-in" to that virtual space. If the user checks into a virtual space, other users may be able to see that the location of the user is in that particular virtual space. Once the user has checked into a virtual space, the user may be able to participate in real-time communicate within the virtual space. The user may not have able to participate in both real-time communication and non-real time communication within the virtual space before checking into the virtual space. By contrast, the user may have been able to participate in only non-real time communication (but not real-time communication) within the virtual space before checking into the virtual space. While the checked-in user is participating in real-time communication in the virtual space, the user and/or other users can participate in non-real-time communication in the virtual space and/or other virtual spaces of the plurality of virtual spaces.

In embodiments, the users that have been joined or check-into a particular virtual space may all want to participate in a live, synchronous communication with one another. However, in some instances, only a portion (e.g., subset) of the users that have been connected to a particular virtual space may want to participate in a live, synchronous communication with one another. For example, if three people are in a virtual space, two of the users may want to have a real-time communication with one another, without the third user. The two users may do so by participating in a live bubble chat. The two users may participate in real-time communication inside of the bubble. The bubble may include a communication channel that is not accessible to the third user that is not in the bubble. However, despite only the two users being in the bubble, they are still in the same virtual space as the third user. Therefore, all three users still may communicate via the communication channel associated with that virtual space. The communication channel associated with the bubble chat may be a sub-channel of the communication channel associated with the virtual space.

In embodiments, the communication service 112 provides one or more offices to the users 210a-n. The plurality of virtual spaces can be divided into the one or more offices so that each virtual space belongs to one or more office. Each of the offices may be a virtual object that allows users 210a-n to associate with it before associating with a virtual space within that office. In this manner, a user 210a-n may be associated with an office before becoming associated with a virtual space.

Each office may be associated with a particular topic, concept, or idea. The virtual spaces included in a particular office may be related to a subset of that particular topic, concept, or idea. For example, an office may be associated with the topic "Animals," and the virtual spaces included in the office may be related to "Cats," "Dogs," etc. In some embodiments, the office may relate to a particular group of people, such as a group of co-workers or colleagues. The virtual spaces included in the office may be related to various topics of interest to that group of people. For example, if an office is related to some or all of the employees of a particular company, the virtual spaces included in that office may be related to various work projects being completed by those employees.

In embodiments, the users 210a-n may need permission to join one or more of the offices. For example, the users 210a-n may need to be given access to join a particular office, such as by an administrator associated with the office. The users 210a-n may need permission to join some offices, while other offices may be open to any user 210a-n to join (without requiring permission or authentication). In some embodiments, the users 210a-n do not need permission to join any of the offices. Instead, the users 210a-n may freely join and leave the offices.

Figure 3:
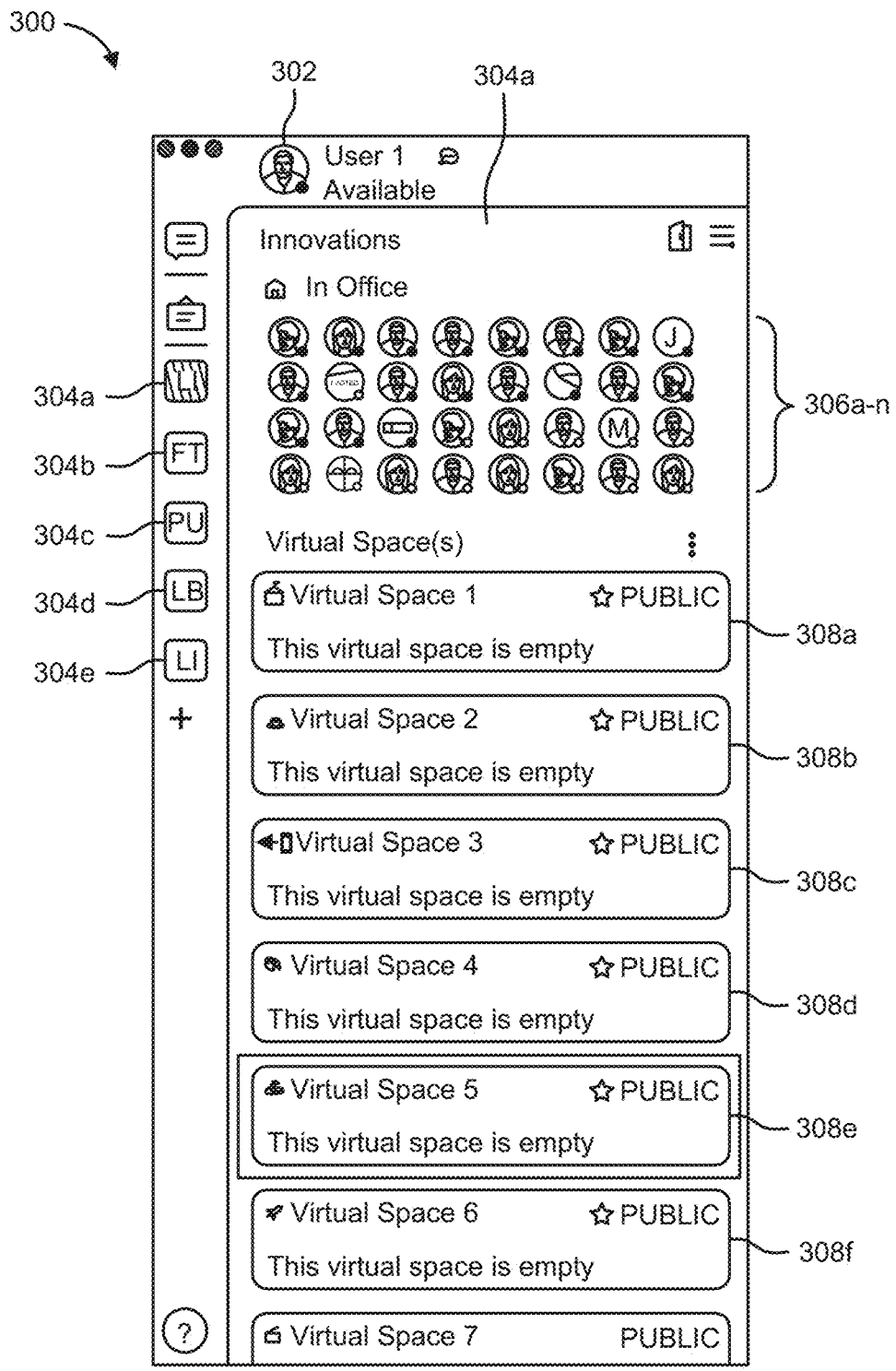
FIG. 3 shows an example user interface for facilitating communication in accordance with the present disclosure.

FIG. 3 illustrates a UI 300 depicting a plurality of virtual spaces provided by a communication service (e.g., communication service 112). The UI 300 may, for example, be displayed on a user device belonging to a user 210a-n associated with the user information 302. The user information 302 indicates one or more of a name, a status/availability, and a photo of the user. User statuses are discussed below in more detail.

As discussed above, in embodiments, the communication service 112 provides one or more offices to the users 210a-n. Each icon 304a-e on the UI 300 corresponds to an office. The user associated with the user device on which the UI 300 is being displayed may select a particular icon 304a-e to join or become associated with the corresponding office. For example, the UI 300 depicts the icon 304a as being selected.

The other users 210a-n that are currently associated with the office corresponding to the icon 304a are displayed on the UI 300. The other users that are currently associated with the office corresponding to the icon 304a are each associated with a particular profile icon 306a-n. For example, the profile icon 306a may correspond to a first user that is currently associated with the office corresponding to the icon 304a, the profile icon 306b may correspond to a second user that is currently associated with the office corresponding to the icon 304a, etc. If the user associated with the user information 302 hovers over a profile icon 306a-n, additional details associated with the user corresponding to that particular profile icon may be displayed on the UI 300. For example, one or more of a status, username, photo, etc. associated with the corresponding user may be displayed on the UI 300. In some embodiments, the profile icons 306a-n may be arranged on the UI 300 in an order that is based on the availability of the users associated with the profile icons 306a-n. However, it should be appreciated that in other embodiments the profile icons 306a-n can be listed in any other order. It should be appreciated that the profile icons may be displayed in any suitable area of an interface. In one example, all of the profile icons may be displayed in the same interface area. In another example, the profile icons may be displayed in different interface areas. It should be also appreciated that the profile icons may be displayed in any other suitable manners. For example, the profile icons may be displayed under a separate and independent profile tab.

Each of the profile icons 306a-n may, if selected by the user associated with the user information 302, direct the user associated with the user information 302 to a profile associated with the selected profile icon 306a-n. For example, if the user associated with the user information 302 selects the profile icon 306a, the user associated with the user information 302 may be directed to a UI displaying the profile associated with the profile icon 306a. User profiles are discussed below in more detail with regard to FIGS. 4-5.

The virtual spaces associated with the office corresponding to the icon 304a are displayed on the UI 300. For example, the virtual spaces may each be represented by a particular card 308a-f. While the UI 300 shows the virtual spaces corresponding to the cards 308a-f as belonging to a particular office (e.g., the office corresponding to the icon 304a), it should be appreciated that in other embodiments, the virtual spaces provided to the users 210-n do not belong to any particular office.

The user may select any one of the cards 308a-f to join or become associated with the corresponding virtual space. For example, the user may see that one of the cards 308a-f corresponds to a virtual space that has a name that is of interest to the user, and/or the user may see, via the cards 308a-f, that a person of interest is in one of the virtual spaces. The user may select that card, such as by clicking on that card. For example, the user may select the card 308e. The virtual space corresponding to the card 308e may be of interest to the user for any number of reasons. For example, the virtual space may be associated with subject matter that is of interest to the user or other users that are of interest to the user may already be in the virtual space. If the user selects the card 308e, the user may join or become associated with the virtual space corresponding to the card 308e.

As discussed above, in some embodiments, the users 210a-n do not need permission to join any of the virtual spaces. Instead, the users 210a-n may freely join and leave the virtual spaces. As depicted by the UI 300, the virtual spaces corresponding to the cards 308a-f are all public virtual spaces, meaning that the users 210a-n do not need permission to join any of the virtual spaces corresponding to the cards 308a-f. However, it should be appreciated that in other embodiments, one or more of the virtual spaces may be private virtual spaces. A private virtual space may be a virtual space that has restrictions on which users may view and/or join the virtual space. For example, a private virtual space may be restricted to those users who are participating in a particular meeting. A public virtual space may be changed to a private virtual space, and vice versa.

Referring back to FIG. 2, in embodiments, the connection management service 224 may connect one or more users 210a-n to a particular virtual space. For example, when a user 210a-n becomes connected to the communication service 112, the connection management service 224 may receive, from a user 210a-n, data indicative of a request to join a particular virtual space. The connection management service 224 may retrieve, from the database(s) 113, data indicative of an identification number (ID) associated with the virtual space that the user 210a-n wants to associate with. The connection management service 224 may utilize said data to connect the user 210a-n to the virtual space that the user has requested to be connected with. After connecting a user to a virtual space, the connection management service 224 may store, in the database(s) 113, data indicating that that particular user has joined that particular virtual space and/or at what time that particular user joined that particular virtual space.

If the user has requested to join a virtual space that the user needs permission to join, the connection management service 224 can retrieve, from the database(s) 113 data indicating whether or not the user has permission to join that particular virtual space. If the user does have permission, the connection management service 224 may connect the user 210a-n to the virtual space that the user has requested to be connected with. Conversely, if the user does not have permission, the connection management service 224 may not connect the user 210a-n to the virtual space that the user has requested to be connected with.

As discussed above, in some embodiments, the virtual spaces may each belong to one or more office. The connection management service 224 may connect one or more users 210a-n to a particular office before connecting the one or more users to a virtual space within that office. For example, when a user 210a-n becomes connected to the communication service 112, the connection management service 224 may receive, from a user 210a-n, data indicative of a request to join a particular office. The connection management service 224 may retrieve, from the database(s) 113, data indicative of an identification number (ID) associated with the office that the user 210a-n wants to associate with. The connection management service 224 may utilize said data to connect the user 210a-n to the office that the user has requested to be connected with. After connecting a user to an office, the connection management service 224 may store, in the database(s) 113, data indicating that that particular user has joined that particular office and/or at what time that particular user joined that particular office.

In embodiments, the users 210a-n can create events or meetings associated with one or more of the virtual spaces. For example, a user can create one or more events, scheduled for some time in the future, that will take place in one or more virtual space(s). Each event may be associated with a time and/or a duration. For example, the user that created the event may assign a start time, end time, and/or a duration to the event. The connection management service 224 may receive, from a user, data indicative of an event. The indication can include the name of the event, a topic associated with the event, the location of the event (e.g., which virtual space the event will take place in), and/or a time or duration associated with the event. The connection management service 224 may store, in the database(s) 113, the data indicative of an event.

In embodiments, each virtual space may be associated with an event schedule. The event schedule associated with a virtual space indicates one or more of: events that have taken place in the virtual space, events that will take place in the virtual space, and/or events that are currently taking place in the virtual space. The connection management service 224 may store, in the database(s) 113, data indicative of event schedules associated with various virtual spaces.

In embodiments, at least a subset of the users 210*a-n* receives notifications or messages when a new event is added to an event schedule associated with a virtual space (e.g., when a new event is scheduled in that virtual space). For example, at least a subset of the users 210*a-n* can receive notifications or messages when a new event is scheduled in any virtual space in any office. In some embodiments, for the subset of users 210*a-n* to receive notifications or messages when a new event is added to the event schedule, those users may need to subscribe to a specific virtual space's events or event schedule. Similarly, users may subscribe to a particular type of event. Those users may only receive notifications about the events that have been subscribed to. For example, the creation of a particular event in a particular virtual space may only prompt notification to those users that have subscribed to events in that virtual space and/or events of that type.

In an embodiment, each of the users 210*a-n* may be associated with a status. The status may indicate the availability of the users 210*a-n*. For example, other users may see the status of a particular user and may gain an understanding of that user's availability. A user's status may indicate that they are available, idle/away, busy, or do not want to be disturbed. Each user 210*a-n* may set his or her own status. Additionally, or alternatively, the user management service 225 may automatically update a user's status, such as after a particular period of time.

In an embodiment, in addition to indicating whether a user is available, idle/away, busy, or does not want to be disturbed, the user's status may indicate a period of time for which that status is applicable. For example, a user's status may indicate that they are busy for the next two hours, or a user's status may indicate that they are available for the next 20 minutes, etc. Each user 210*a-n* may adjust this time period manually. Additionally, or alternatively, the user management service 225 may automatically populate this time period based on, for example, a calendar associated with the user.

In an embodiment, in addition to indicating whether a user is available, idle/away, busy, or does not want to be disturbed, the user's status may indicate a location associated with that user. As discussed above, a user may be in a virtual space. That user's status may indicate that they are available to communicate and that they are in that virtual space. Other users may see this location indication and may use it to initiate communication with that user. For example, if user 210*a* wants to communicate with user 210*b*, and sees that user 210*b* is available and in a particular virtual space, user 210*a* may join that virtual space and initiate a chat or video conference with the user 210*b*.

In some embodiments, the virtual space is more than a mechanism to facilitate real-time communications such as video conference, rather it can function as a repository of information and communications related to a particular topic and provide a history of the development of ideas. For example, the virtual space may store the entire history of all of the forms of communication that occurred in the virtual space, including text messages, videos, documents, uniform resource locator exchanges, and so on.

The user management service 225 may store, in the database(s) 113, data indicative of the status of each user 210*a-n*. The user management service 225 may update/modify such data if/when a user changes his or her status. Additionally, or alternatively, the user management service 225 may update/modify such data if/when the user management service 225 automatically updates a user's status. Likewise, the user management service 225 may store, in the user status database 234, data indicative of the time period associated with the status of each user 210*a-n*. The user management service 225 may update/modify such data if/when the user updates the time period or if the user management service 225 automatically updates the time period. The user management service 225 may store, in a user location database 252, data indicative of the location of each user 210*a-n*. The user management service 225 may update/modify, in the user location database 252, the data indicative of the location of each user 210*a-n* when the user's location changes (e.g., the user leaves a virtual space and/or joins a different virtual space, etc.).

Figure 4:
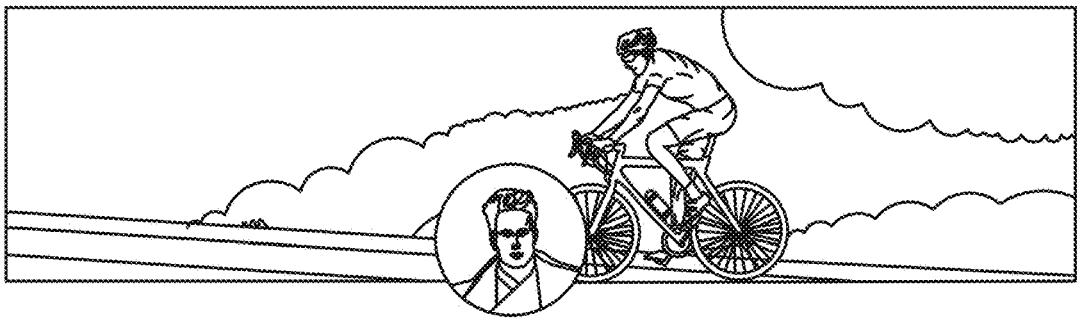
FIG. 4 shows another example user interface for facilitating communication in accordance with the present disclosure.

In an embodiment, the users 210*a-n* may each be associated with a profile. FIG. 4 illustrates a UI 400 depicting a profile associated with a user 210*a-n*. For example, when an individual becomes a registered user of the communication service 112, the individual may provide, to the communication service 112, information associated with the individual. Some or all of this information may be used to generate and/or populate a profile associated with the individual. For example, the profile may indicate one or more of a name associated with the user, a profile and/or cover photo associated with the user, biographical information associated with the user, movies/books/television shows liked by and/or consumed by the user, photos/video posted by the user, and/or photos/videos including the user posted by other users. If the profile includes biographical information, the biographical information may indicate a hometown, current city, job title, and/or personality traits of the user.

The profile may include past work experiences and/or personal accomplishments associated with the user. In an embodiment, the profile includes links (e.g., links to documents, videos, photos) associated with past work experiences and/or personal accomplishments of the user. Other users 210*a-n* may be able to view the user's profile and view the user's past work product or personal accomplishments. If the profile includes links associated with the past work experiences or personal accomplishments of the user, then the other users may be able to select (e.g., click on) those links to view the past work product or personal accomplishments of the user. The profile may include a particular section that indicates kudos received from other users 210*a-n*. The kudos may indicate compliments from the other users, such as compliments regarding the user's work product, work ethic, or personal accomplishments.

Figure 5:
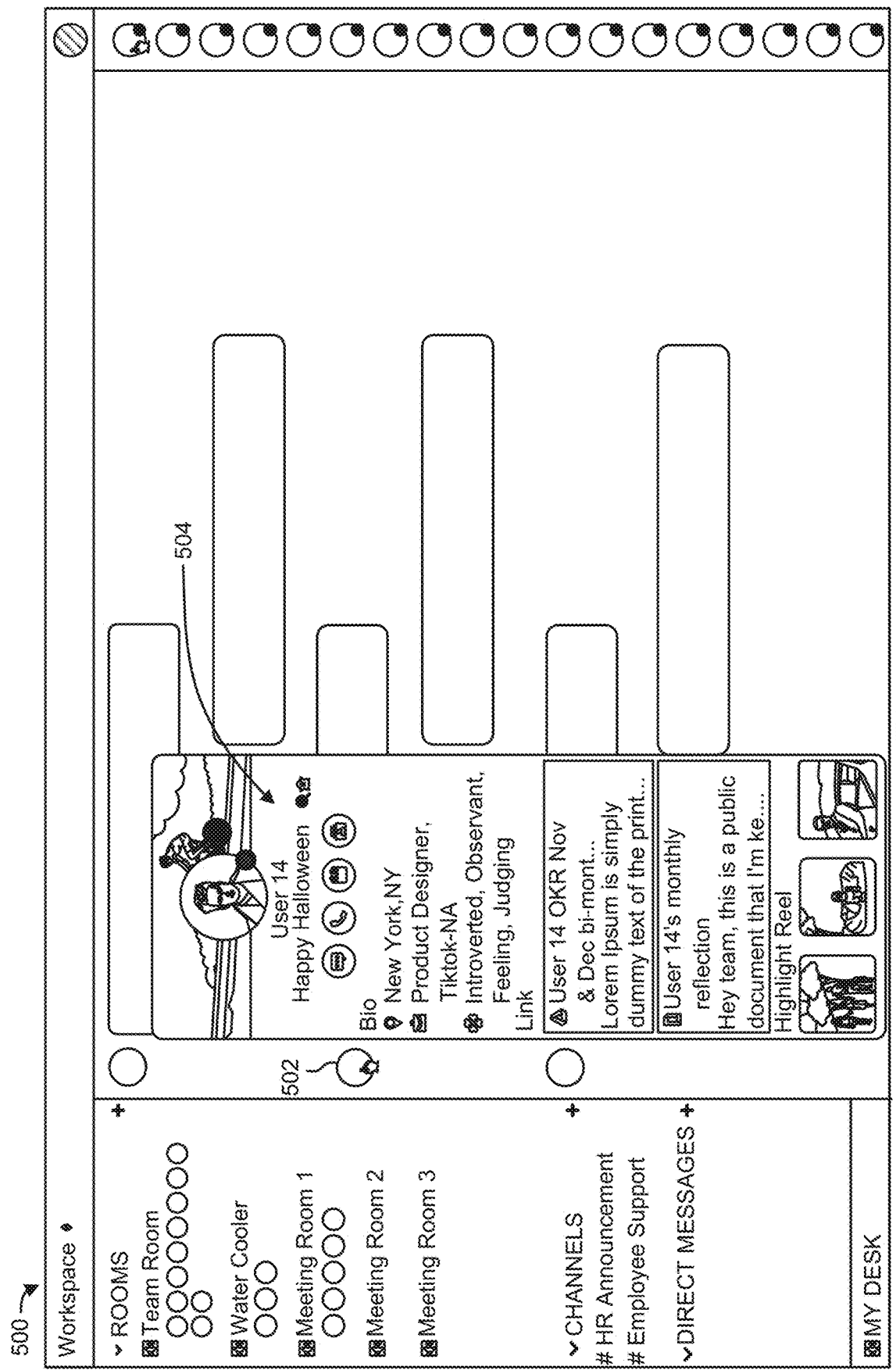
FIG. 5 shows another example user interface for facilitating communication in accordance with the present disclosure.

A condensed version of a user's profile may be displayed if another user scrolls over an icon associated with that user, such as one of the icons 306*a-n* depicted in FIG. 3. FIG. 5 illustrates a UI 500 that depicts a condensed version 504 of the user's profile that is depicted in FIG. 4. The version 504 of the profile may be displayed when another user scrolls over an icon 502 associated with the user to which the profile belongs. The icon 502 may, for example, be displayed within the text chat in a virtual space in order to indicate which user sent which text to the chat. As another example, the icon 502 may be displayed within a live chat (video or audio) in which the user is participating. By scrolling over the icon 502, the another user may be able to view the version 504 of the profile and gain a quick, comprehensive understanding of that user. For example, the another user may utilize this understanding to determine if the another user wants to initiate a communication with the user.

Referring back to FIG. 2, in an embodiment, the users 210*a*-*n* may communicate asynchronously with each other via the communication service 112. For example, the users 210*a*-*n* may text message and/or instant message each other and/or may post comments related to content previously shared by other users. The communication management service 226 facilitates such asynchronous communication amongst users 210*a*-*n*. For example, the communication management service 226 may initiate a communication channel between two users via a chat service 222 so that they may participate in asynchronous communication with each other. The communication channel may be initiated, for example, within the virtual space that the two users are in. For example, the communication management service 226 may initiate a communication channel between two users via the chat service 222 in response to receiving a request to start a chat. The chat service 222 may be a device and/or a program running on a device of the communication service 112.

The chat service 222 may be configured to receive inputs from users 210. The users 210 may be users of a communication application 240 operating on user devices 242. The user inputs may include text messages and/or instant messages. Participants of an asynchronous communication may comprise any users 210*a*-*n* who are allowed to participate in the asynchronous communication in any manner.

The chat service 222 may manage the asynchronous communication. For instance, the chat service 222 may categorize the conversations. The chat service 222 may store the conversations, any associations with the conversation, and/or conversation metadata in the database(s) 113. The chat service 222 may update, in the database(s) 113, the data when a new asynchronous communication between the users 210*a*-*n* occurs.

In an embodiment, the users 210*a*-*n* may communicate synchronously with each other via the communication service 112. For example, the users 210*a*-*n* may video and/or audio conference with each other. The communication management service 226 facilitates such synchronous communication amongst users 210*a*-*n*. For example, the communication management service 226 may initiate a communication channel between two users via a video/audio conference service 253 so that they may participate in synchronous communication with each other. The communication channel may be initiated, for example, within the virtual space that the two users are in. For example, the communication management service 226 may initiate a communication channel via the video/audio conference service 253 between two users via the video/audio conference service 253 in response to receiving a request to start a video/audio conference. The video/audio conference service 253 may be a device and/or a program running on a device of the communication service 112.

The video/audio conference service 253 may be configured to receive inputs from users 210. The users 210 may be users of a communication application 240 operating on user devices 242. The user inputs may include live video and/or audio feed. Participants of a synchronous communication may comprise any users 210*a*-*n* who are allowed to participate in the synchronous communication in any manner.

The video/audio conference service 253 may manage the synchronous communication. For instance, the video/audio conference service 253 may categorize the conversations. The video/audio conference service 253 may store the conversations, any associations with the conversation, and/or conversation metadata in the database(s) 113. The video/audio conference service 253 may update, in the database(s) 113, the data when a new synchronous communication between the users 210*a*-*n* occurs.

It should be appreciated that the communication service 112 in FIG. 2 is merely illustrative and other implementations might be utilized. It should also be appreciated that the functionality disclosed herein may be implemented by one or more servers or computing devices. Additionally, it should be appreciated that the functionality disclosed herein might be implemented in software, hardware or a combination of software and hardware.

As discussed above, existing internet-based communication tools do not disseminate information to as broad an audience as possible. Accordingly, many users of such internet-based communication tools may need to spend additional time disseminating the same information via multiple different internet-based communication tools in order to reach all of the desired audience. In embodiments, the communication service 112 remedies this shortcoming of existing internet-based communication tools by allowing a user of the communication service 112 to simultaneously share information to both that user's profile and one or more virtual spaces. Because a user is able to simultaneously communicate the same information via a profile and one or more virtual spaces, the user is able to disseminate the information to a greater audience.

Figure 6:
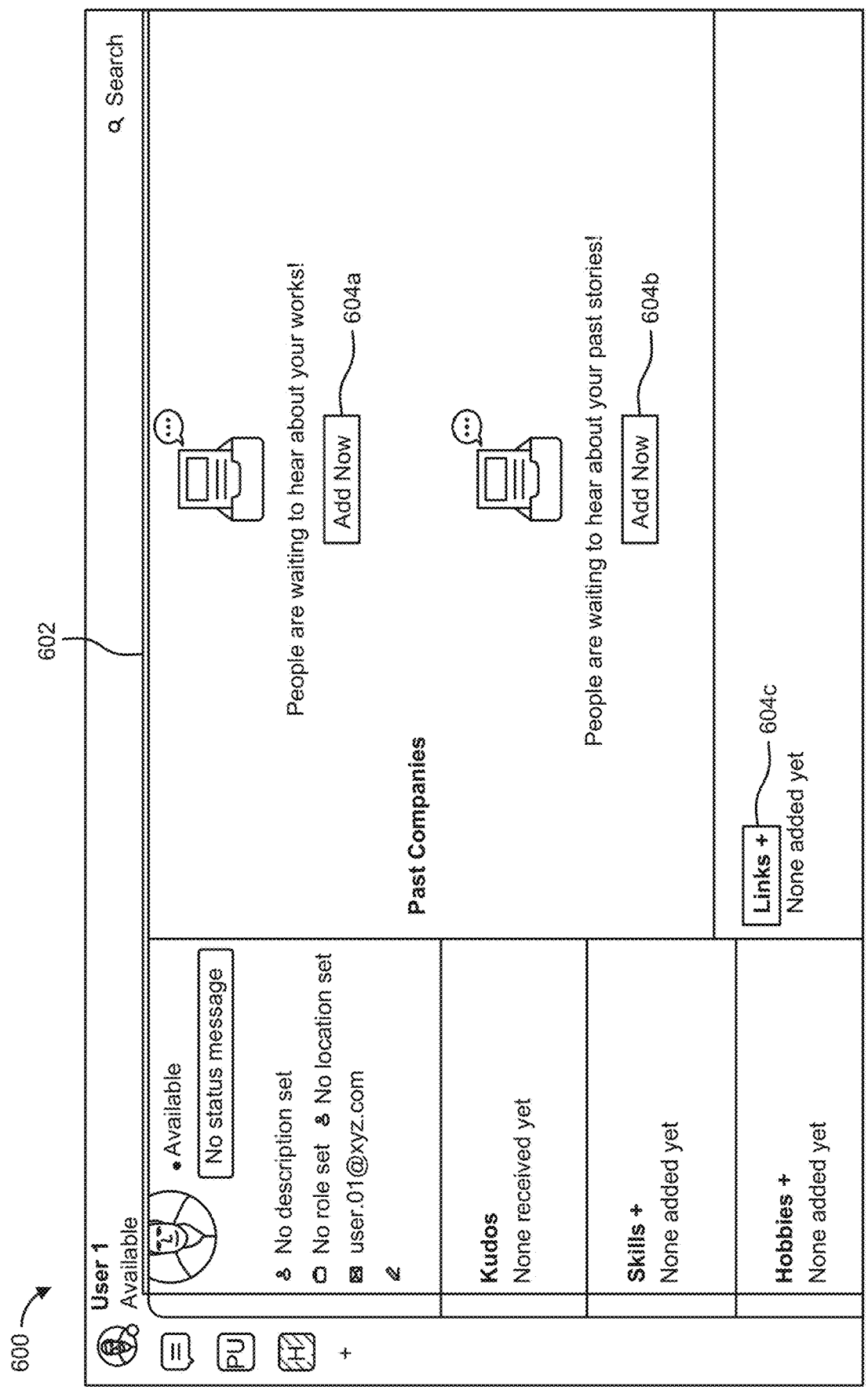
FIG. 6 shows another example user interface for facilitating communication in accordance with the present disclosure.

FIG. 6 shows a UI 600 depicting an update being made to a profile 602 (e.g., profile 400) of a user of a communication service (e.g., the communication service 112). For example, the user can select one or more of the buttons 604*a*-*c* to modify or updated the profile 602. By selecting the button 604*a*, the user can add information indicative of the user's accomplishments to the profile 602. The accomplishments may be professional and/or personal accomplishments. By selecting the button 604, the user can add information indicative of the user's past stories. The past stories may include any personal or professional information that the user wants to add to the profile 602.

Figure 7:
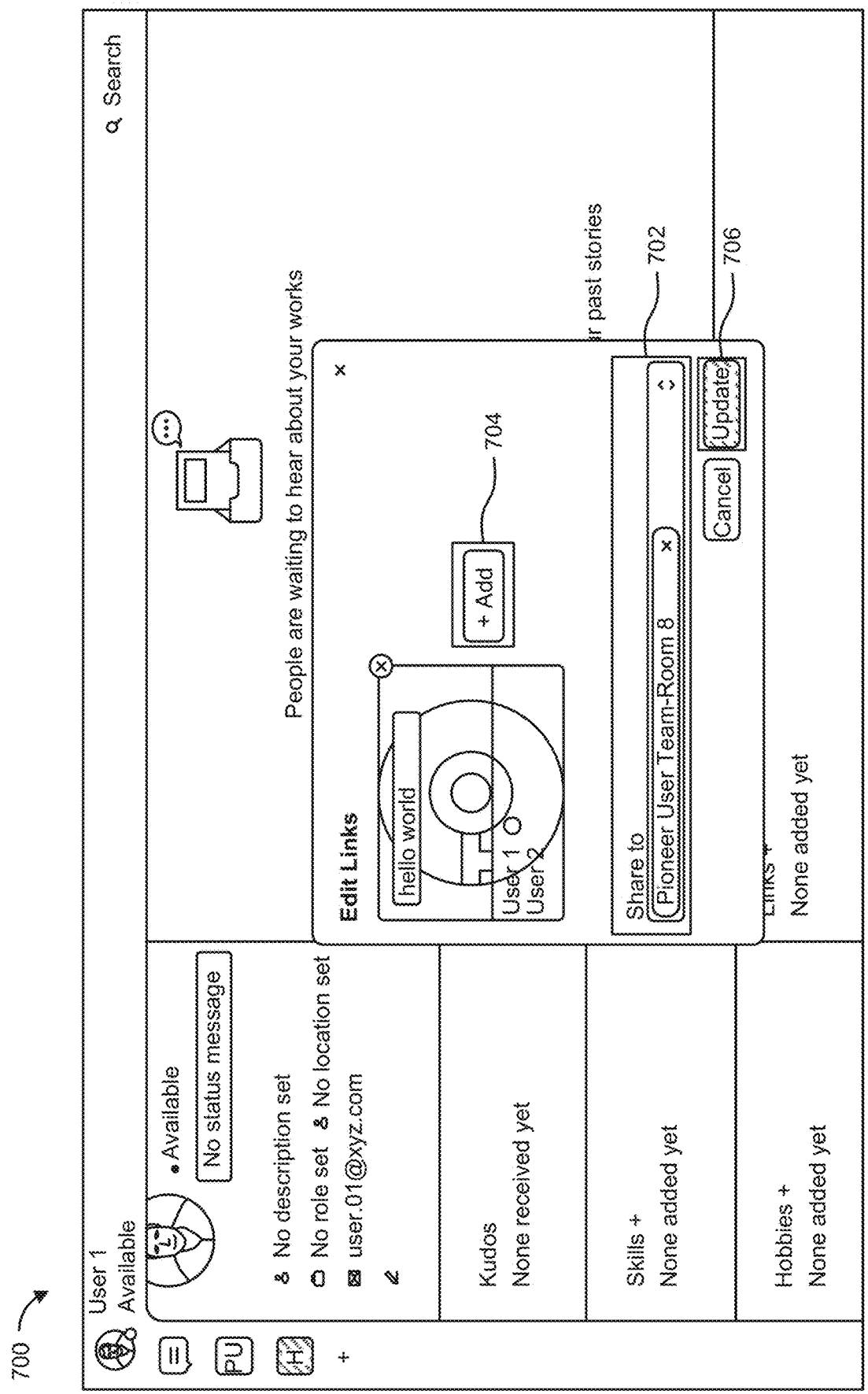
FIG. 7 shows another example user interface for facilitating communication in accordance with the present disclosure.

The information being added to the profile 602 (e.g., the accomplishments and/or the past stories) may include information that the user wants to disseminate to a broad audience. For example, the user may want such information to be added to the profile 602 so that any viewer of the profile 602 can consume the information. The user may additionally want such information to be disseminate to one or more virtual spaces, so that the users in those virtual spaces can consume the information. FIG. 7 shows a UI 700 depicting an indication 702 of a virtual space to which the user wants information being added to the profile 602 to be disseminated. In some embodiments, the indication 702 may indicate more than one virtual space to which the user wants information being added to the profile 602 to be disseminated.

By selecting the button 604*c*, the user can add a link to the profile 602. The link may, for example, be a link to information indicative of the user's accomplishments or past stories. The link may be a hyperlink, URL, etc. For example, if selected, the link may direct a user to a webpage or document that outlines or provides more detail on the accomplishment or past story. The link may alternatively be unrelated to the user's accomplishments or past stories. Instead, the link may be any link that the user wants to share on the profile 602. The user may indicate such a link by selecting a button 704. If the button 704 is selected, the user may be prompted to enter the link. In embodiments, the user may add more than one link corresponding to a single profile update. When the user has finished adding the link(s) and selecting the virtual space(s) to which the information including the link(s) should be disseminated, the user can select a button 706. By selecting the button 706, the information, such as the information including the link(s), is simultaneously disseminated to the appropriate virtual space(s) and published to the profile 602.

Figure 8:
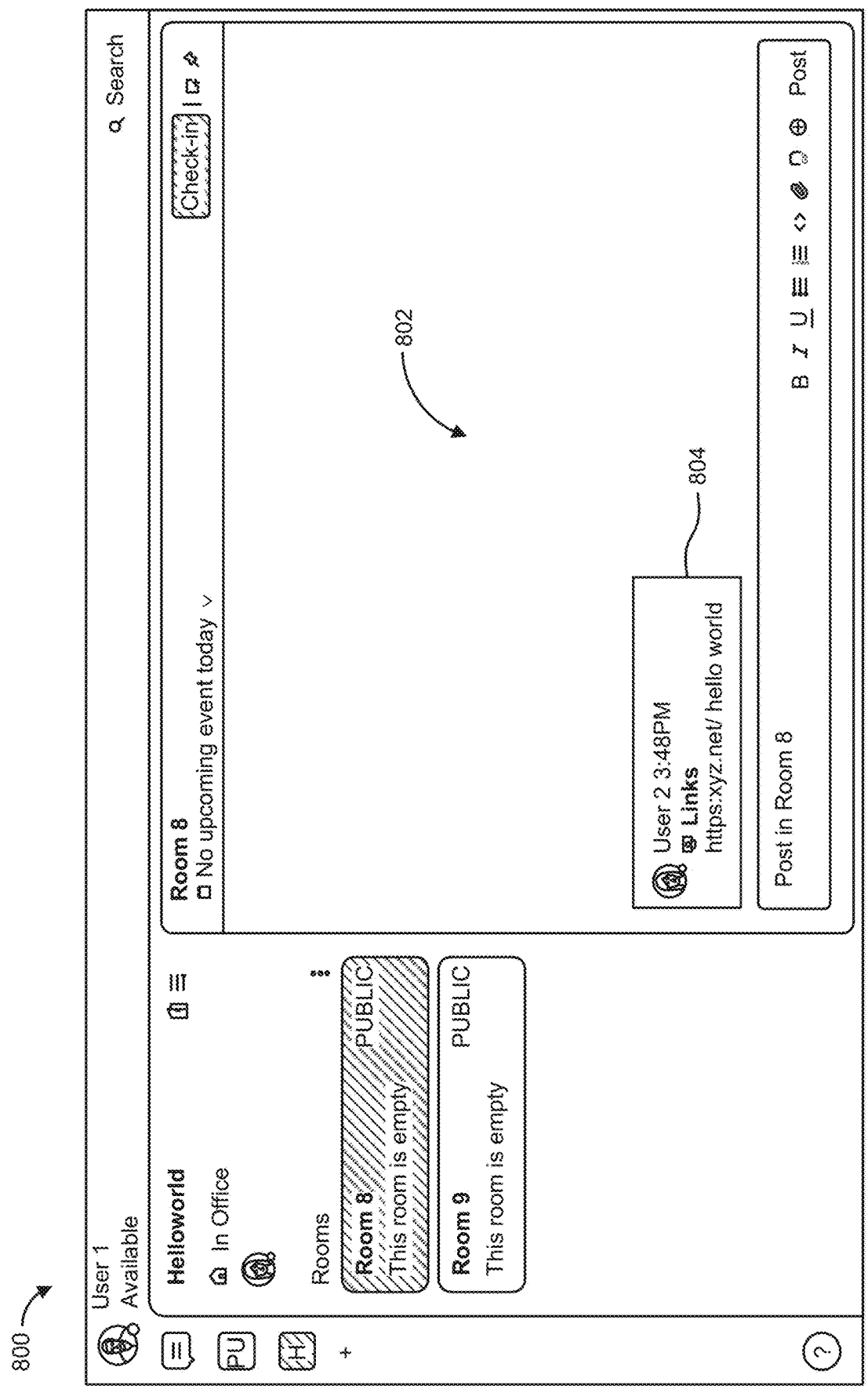
FIG. 8 shows another example user interface for facilitating communication in accordance with the present disclosure.

When the information, such as the information including the link(s) is disseminated to the virtual space(s), the information may be displayed in a text chat associated with the virtual space(s) selected by the user. FIG. 8 shows a UI 800 that depicts a text chat 802 associated with a virtual space. For example, the virtual space in FIG. 8 is entitled "Water Cooler." The UI 800 may be displayed on a device associated with a different user (e.g., a user other than the user to which the profile 602 belongs). For example, the profile 602 may be associated with a first user. A second, different user may be in the virtual space "Water Cooler." The first user may or may not be in the virtual space "Water Cooler."

The users in the virtual space "Water Cooler" can communicate with each other, such as by video chat and/or text chat (via the text chat 802). An indication 804 of the information that was published to the profile 602 may be displayed in the text chat 802. For example, the indication 804 may be displayed in the text chat 802 at the same time (or within a certain timeframe) as the information is published to the profile 602. The indication 804 may appear as though it is sent to the text chat 802 from the first user. If the information includes a link, the link may be displayed in the text chat 802 via the indication 804. The link may be selectable by any user that is in the virtual space "Water Cooler." If selected, the link may direct the user that selected it to a webpage or document that outlines or provides more detail on the information that was published on the profile 602.

The second user in the virtual space may view the information via the indication 804. The second user may want to respond to or interact with the information indicated by the indication 804. For example, the information may indicate an accomplishment of the first user, and the second user may be impressed by the accomplishment and may want to congratulate or acknowledge the first user.

Figure 9:
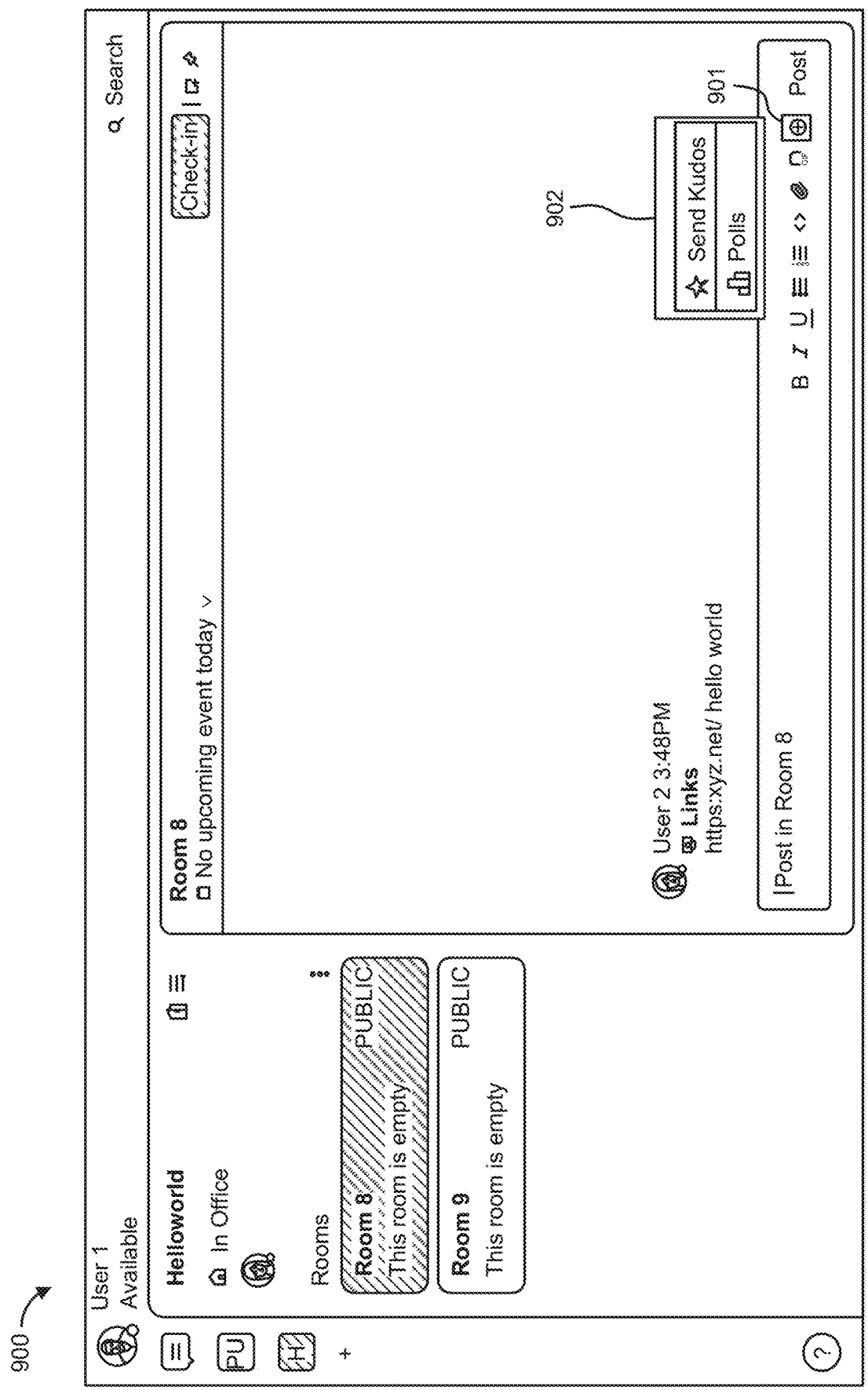
FIG. 9 shows another example user interface for facilitating communication in accordance with the present disclosure.

FIG. 9 shows a UI 900 depicting the second user interacting with the indication 804. For example, the second user may be able to hover over or select the indication 804. If the second user hovers over or selects the indication 804, an indication 902 may be displayed. Alternatively, the second user can select a button 901. If the user selects the button 901, the indication 902 may be displayed. The indication 902 provides the second user with various actions that the second user can take with respect to the indication 804. For example, the second user may be able to select "send Kudos" to the first user via the indication 902. If the second user selects "sends Kudos" to the first user, this may indicate that the second user wants to congratulate or acknowledge the first user, such as based on the information indicated via the indication 804. For example, the second user may have selected the link and been impressed by the link. As a result, the second user may want to "send Kudos" to the first user. In embodiments, the second user may be able to view polls associated with the indication 804 via the indication 902. The polls may indicate polls that have been taken within the virtual space related to the indication 804.

Figure 10:
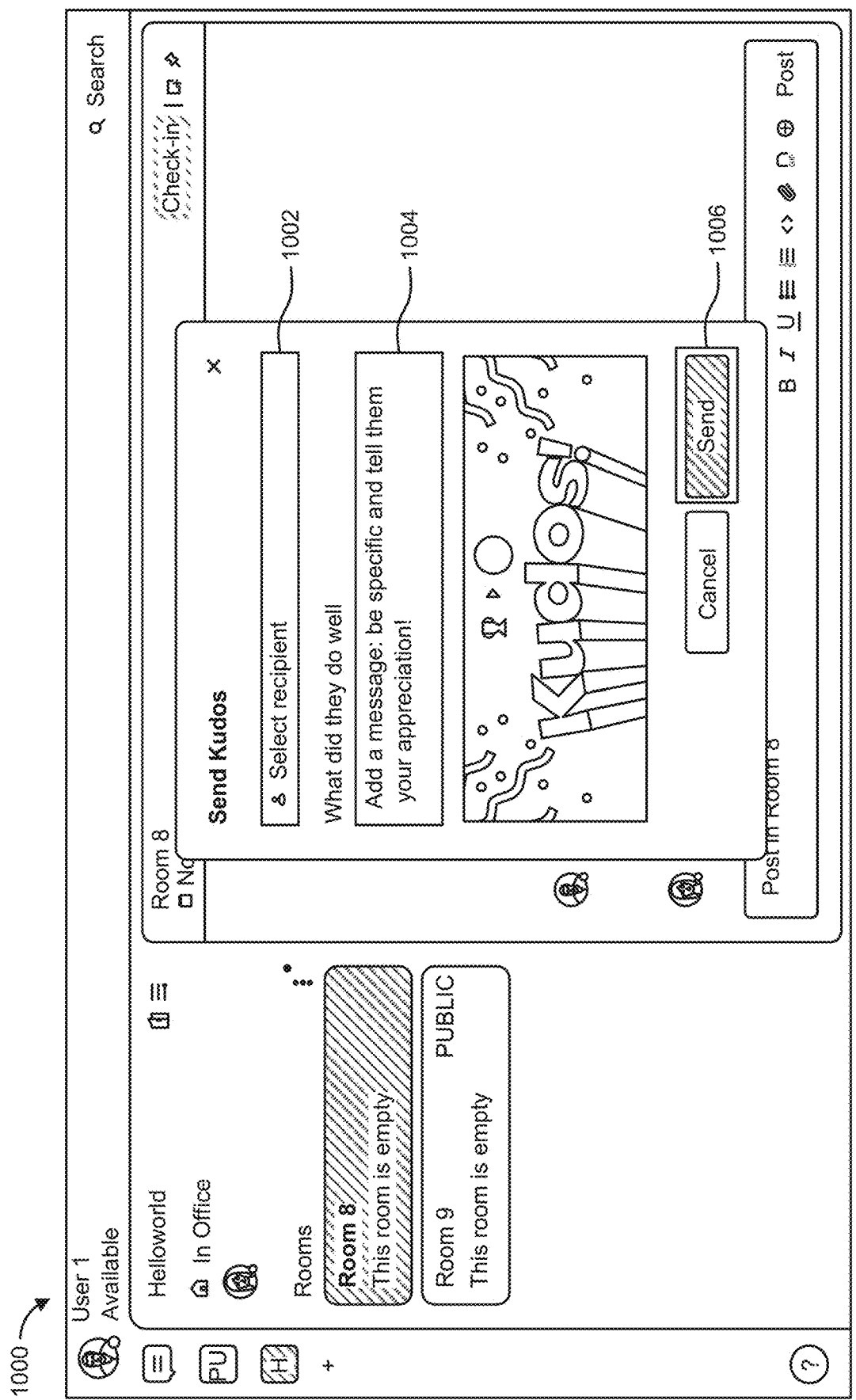
FIG. 10 shows another example user interface for facilitating communication in accordance with the present disclosure.

FIG. 10 shows a UI 1000 depicting the second user sending kudos to the first user. If the second user wants to "send Kudos" to the first user, the second user may indicate a recipient of the Kudos (e.g., the first user) via a first box 1002. The second user may indicate, via a second box 1004, a message for the recipient of the Kudos. For example, in the box 1004, the user may write a message that indicates why the second user is sending a kudos to the first user. For example, the message may indicate the second user's appreciate or acknowledgement of the first user. After the second user has filled out the box 1002 and/or the box 1004, a preview of the kudo may be displayed. The preview may, for example, include an avatar of the recipient. The second user can cause the kudos to be sent to the first user by selecting a button 1006.

If the second user selects the button 100, the kudos may be sent to the first user. For example, the kudos may be published on the profile 602 associated with the first user. Any other user that views the profile 602 associated with the first user can see that the second user sent kudos to the first user. For example, the kudos may be published in a section of the profile 602 that is dedicated to kudos. Any kudos that the first user has previously received from any other user may be published in the particular section.

Figure 11:
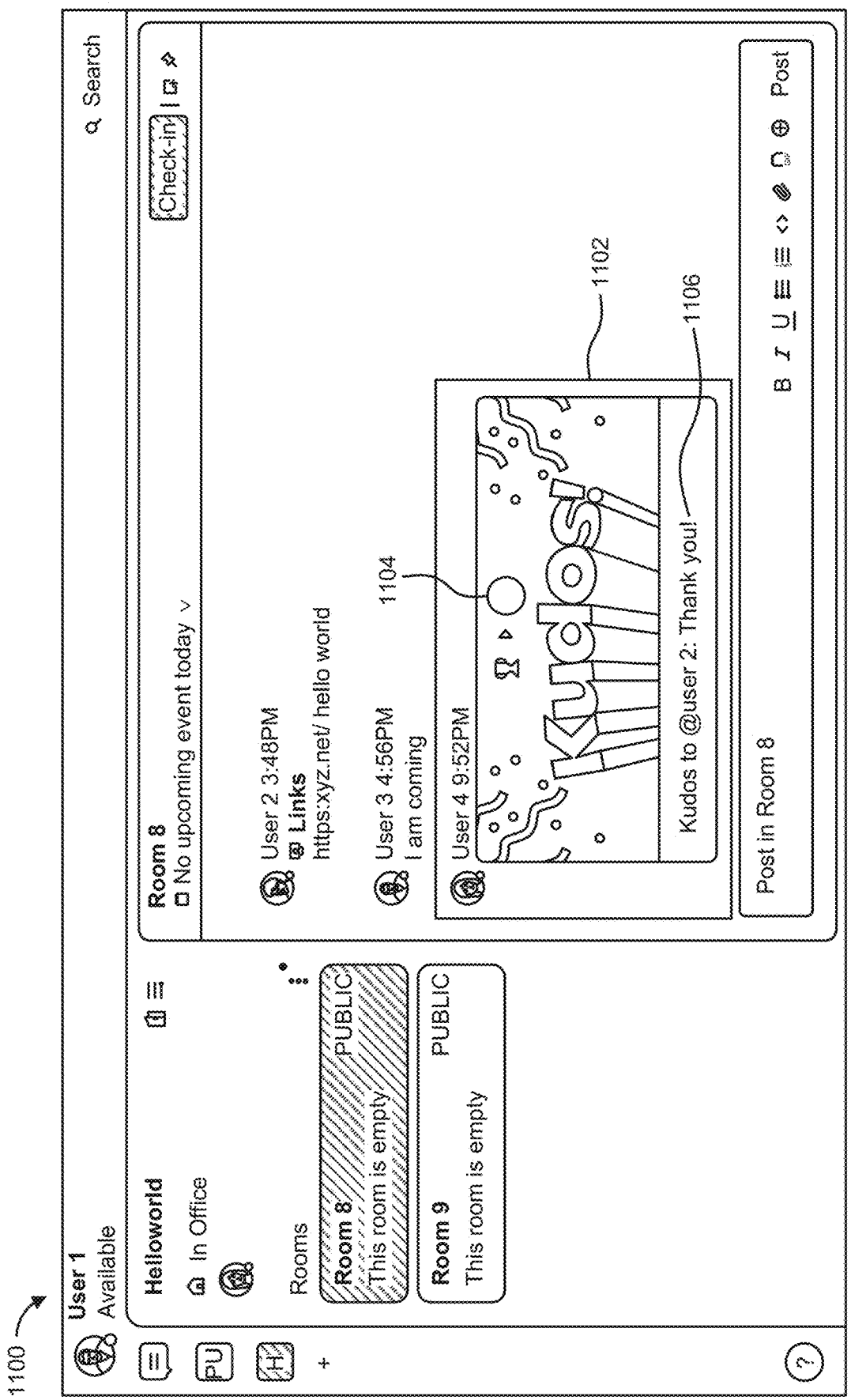
FIG. 11 shows another example user interface for facilitating communication in accordance with the present disclosure.

FIG. 11 shows a UI 1100 that depicts a kudos 1102 posted in the text chat of a virtual space. In addition to, or as an alternative to, the kudos being published on the profile 602 associated with the first user, the kudos may be displayed or posted in the text chat of the virtual space (such as the text chat of the virtual space that includes the indication 804). The kudos may be an artifact that comprises a message and/or a computer-generated graphic image. For example, as shown in FIG. 11, the kudos 1102 comprises a graphic image including the word "KUDOS!", a profile picture 1104 of the recipient (e.g., the first user), and a message 1106 to the recipient.

FIG. 12 illustrates an example process 1200 for facilitating communication, which may be performed by a communication service (e.g., communication service 112) in accordance with the present disclosure. For example, the process 1200 may be utilized to simultaneously communicate the same information via a profile and one or more virtual spaces. As such, the process 1200 facilitates the user's ability to disseminate information to a greater audience. Although depicted as a sequence of operations in FIG. 12, those of ordinary skill in the art will appreciate that various embodiments may add, remove, reorder, or modify the depicted operations.

As discussed above, the one or more databases 113 may be configured to store data associated with the users of the communication service 112, data associated with virtual space(s) for communication provided by the communication service 112, and/or data associated with past, current, or future scheduled communication amongst the users of the communication service 112. At 1202, data associated with a plurality of users and data associated with at least one virtual space may be maintained in at least one database (e.g., database(s) 113). The plurality of users may be users of the communication service 112. The plurality of users and the at least one virtual space are associated with a collaborative work environment. At least one subset of the plurality of users may share information via the at least one virtual space. For example, at least one subset of the plurality of users may currently be joined to a particular virtual space. The subset of the plurality of users may communicate within the virtual space.

The data associated with the plurality of users comprise data associated with a plurality of profiles corresponding to the plurality of users. For example, each of the plurality of users may be associated with a particular profile of the plurality of profiles. As discussed above, the profile for each user may indicate one or more of a name associated with the user, a profile and/or cover photo associated with the user, biographical information associated with the user, movies/books/television shows liked by and/or consumed by the user, photos/video posted by the user, and/or photos/videos including the user posted by other users. If the profile includes biographical information, the biographical information may indicate a hometown, current city, job title, and/or personality traits of the user.

The profile may include past work experiences and/or personal accomplishments associated with the user. In an embodiment, the profile includes links (e.g., links to documents, videos, photos) associated with past work experiences and/or personal accomplishments of the user. Other users may be able to view the user's profile and view the user's past work product or personal accomplishments. If the profile includes links associated with the past work experiences or personal accomplishments of the user, then the other users may be able to select (e.g., click on) those links to view the past work product or personal accomplishments of the user. The profile may include a section that indicates kudos received by the user from other users. The kudos may indicate compliments from the other users, such as compliments regarding the user's work product, work ethic, or personal accomplishments.

A first user may want to update his or her profile (e.g., a first profile). For example, the first user may want to update the first profile with information indicative of the user's accomplishments. The accomplishments may be professional and/or personal accomplishments. Additionally, or alternatively, the user can add information indicative of the user's past stories. The past stories may include any personal or professional information that the user wants to add to the first profile. At 1204, data indicative of an update to the first profile among the plurality of profiles corresponding to the first user among the plurality of users may be received.

The information that the first user wants to add to the first profile may include information that the user wants to disseminate to a broad audience. For example, the user may want such information to be added to the first profile so that any viewer of the first profile can consume the information. The user may additionally want such information to be disseminate to at least one virtual space, so that the users in those virtual spaces can consume the information. Accordingly, the data indicative of the update to the first profile may comprise information identifying the at least one virtual space. In some embodiments, first user may identify more than one virtual space that the first user wants the information to be disseminated to. The information that the first user wants to add to the first profile may include, in some embodiments, a link (e.g., hyperlink, URL, etc.). The link may be associated with the accomplishment or past story that the user is updating the first profile to reflect. The information identifying the at least one virtual space may include the link.

At 1206, the first profile may be automatically updated based on the data indicative of the update, and information corresponding to the data indicative of the update may be automatically added to the at least one virtual space. In some examples, the first profile may be updated at the same time as the information is added to the at least one virtual space. For example, the first profile may be updated and the information added to the at least one virtual space synchronously. In other example, the first profile may be automatically updated based on the data indicative of the update, and information corresponding to the update of the first profile may be automatically added to the at least one virtual space. The first profile may be updated by publishing the accomplishment or past story on the first profile. The information may be added to the at least one virtual space by displaying the information in a text chat associated with the virtual space(s). Any user in the virtual space(s) can see the information in the text chat. The first user may or not may not be in the virtual space(s) to which the information is disseminated. If the information includes a link, the link may be displayed in the text chat. The link may be selectable by any user that is in the virtual space. If selected, the link may direct the user that selected it to a webpage or document that outlines or provides more detail on the information that was published on the first profile.

FIG. 13 illustrates an example process 1300 for facilitating communication, which may be performed by a communication service (e.g., communication service 112) in accordance with the present disclosure. For example, the process 1300 may be utilized to simultaneously communicate the same information via a profile and one or more virtual spaces. As such, the process 1300 facilitates the user's ability to disseminate information to a greater audience. Although depicted as a sequence of operations in FIG. 13, those of ordinary skill in the art will appreciate that various embodiments may add, remove, reorder, or modify the depicted operations.

As discussed above, the one or more databases 113 may be configured to store data associated with the users of the communication service 112, data associated with virtual space(s) for communication provided by the communication service 112, and/or data associated with past, current, or future scheduled communication amongst the users of the communication service 112. At 1302, data associated with a plurality of users and data associated with at least one virtual space may be maintained in at least one database (e.g., database(s) 113). The plurality of users may be users of the communication service 112. At least one subset of the plurality of users may share information via the at least one virtual space. For example, at least one subset of the plurality of users may currently be joined to a particular virtual space. The subset of the plurality of users may communicate within the virtual space.

The data associated with the plurality of users comprise data associated with a plurality of profiles corresponding to the plurality of users. For example, each of the plurality of users may be associated with a particular profile of the plurality of profiles. As discussed above, the profile for each user may indicate one or more of a name associated with the user, a profile and/or cover photo associated with the user, biographical information associated with the user, movies/books/television shows liked by and/or consumed by the user, photos/video posted by the user, and/or photos/videos including the user posted by other users. If the profile includes biographical information, the biographical information may indicate a hometown, current city, job title, and/or personality traits of the user.

The profile may include past work experiences and/or personal accomplishments associated with the user. In an embodiment, the profile includes links (e.g., links to documents, videos, photos) associated with past work experiences and/or personal accomplishments of the user. Other users may be able to view the user's profile and view the user's past work product or personal accomplishments. If the profile includes links associated with the past work experiences or personal accomplishments of the user, then the other users may be able to select (e.g., click on) those links to view the past work product or personal accomplishments of the user. The profile may include a section that indicates kudos received by the user from other users. The kudos may indicate compliments from the other users, such as compliments regarding the user's work product, work ethic, or personal accomplishments.

A first user may want to update his or her profile (e.g., a first profile). For example, the first user may want to update the first profile with information indicative of the user's accomplishments. The accomplishments may be professional and/or personal accomplishments. Additionally, or alternatively, the user can add information indicative of the user's past stories. The past stories may include any personal or professional information that the user wants to add to the first profile. At 1304, data indicative of an update to the first profile among the plurality of profiles corresponding to the first user among the plurality of users may be received.

The information that the first user wants to add to the first profile may include information that the user wants to disseminate to a broad audience. For example, the user may want such information to be added to the first profile so that any viewer of the first profile can consume the information. The user may additionally want such information to be disseminate to at least one virtual space, so that the users in those virtual spaces can consume the information. Accordingly, the data indicative of the update to the first profile may comprise information identifying the at least one virtual space. In some embodiments, first user may identify more than one virtual space that the first user wants the information to be disseminated to. The information that the first user wants to add to the first profile may include, in some embodiments, a link (e.g., hyperlink, URL, etc.). The link may be associated with the accomplishment or past story that the user is updating the first profile to reflect. The information identifying the at least one virtual space may include the link.

At 1306, the first profile may be automatically updated based on the data indicative of the update, and information corresponding to the data indicative of the update may be automatically added to the at least one virtual space. In some examples, the first profile may be updated at the same time as the information is added to the at least one virtual space. For example, the first profile may be updated and the information added to the at least one virtual space synchronously. In other example, the first profile may be automatically updated based on the data indicative of the update, and information corresponding to the update of the first profile may be automatically added to the at least one virtual space. The first profile may be updated by publishing the accomplishment or past story on the first profile. The information may be added to the at least one virtual space by displaying the information in a text chat associated with the virtual space(s). Any user in the virtual space(s) can see the information in the text chat. The first user may or not may not be in the virtual space(s) to which the information is disseminated. If the information includes a link, the link may be displayed in the text chat. The link may be selectable by any user that is in the virtual space. If selected, the link may direct the user that selected it to a webpage or document that outlines or provides more detail on the information that was published on the first profile.

As described above, a different user (e.g., a second user) in the virtual spaces(s) may see the information posted in the text chat associated with the virtual space(s). The second user may want to respond to or interact with the information. For example, the information may indicate an accomplishment of the first user, and the second user may be impressed by the accomplishment and may want to congratulate, thank, or acknowledge the first user.

To do so, the second user "send Kudos" to the first user. If the second user selects "sends Kudos" to the first user. Sending kudos to the first user may indicate that the second user wants to congratulate or acknowledge the first user, such as based on the information indicated via the indication 804. For example, the second user may have selected the link and been impressed by the link. As a result, the second user may want to "send Kudos" to the first user. If the second user wants to "send Kudos" to the first user, the second user may indicate a recipient of the Kudos (e.g., the first user) and/or may indicate a message for the recipient of the Kudos. The message can, for example, indicate the second user's appreciation of or acknowledgement of the first user.

The second user may send the kudos to the first user. At 1308, information sent from a second user to the first user may be received. The information may include, for example, the kudos. The information sent from the second user to the first user comprises information identifying the first user as the recipient. The kudos may be an artifact that comprises a message and/or a computer-generated graphic image. For example, the kudos 1102 as shown in FIG. 11 comprises both a graphic image of the word "KUDOS!" and a message beneath the graphic image.

The kudos may be simultaneously or synchronously published on the first profile and/or in a text chat in the virtual space(s). At 1310, the first profile corresponding to the first user may be automatically updated based on the information sent from the second user to the first user, and the information sent from the second user to the first user may be automatically added to the at least one virtual space. Any other user that views the first profile can see that the second user sent kudos to the first user. For example, the kudos may be published in a section of the first profile that is dedicated to kudos. Any kudos that the first user has previously received from any other user may be published in the particular section. The kudos may additionally or alternatively be posted in the text chat of a virtual space (such as the text chat of the virtual space that the first user disseminate the profile update information to).

Figure 14:
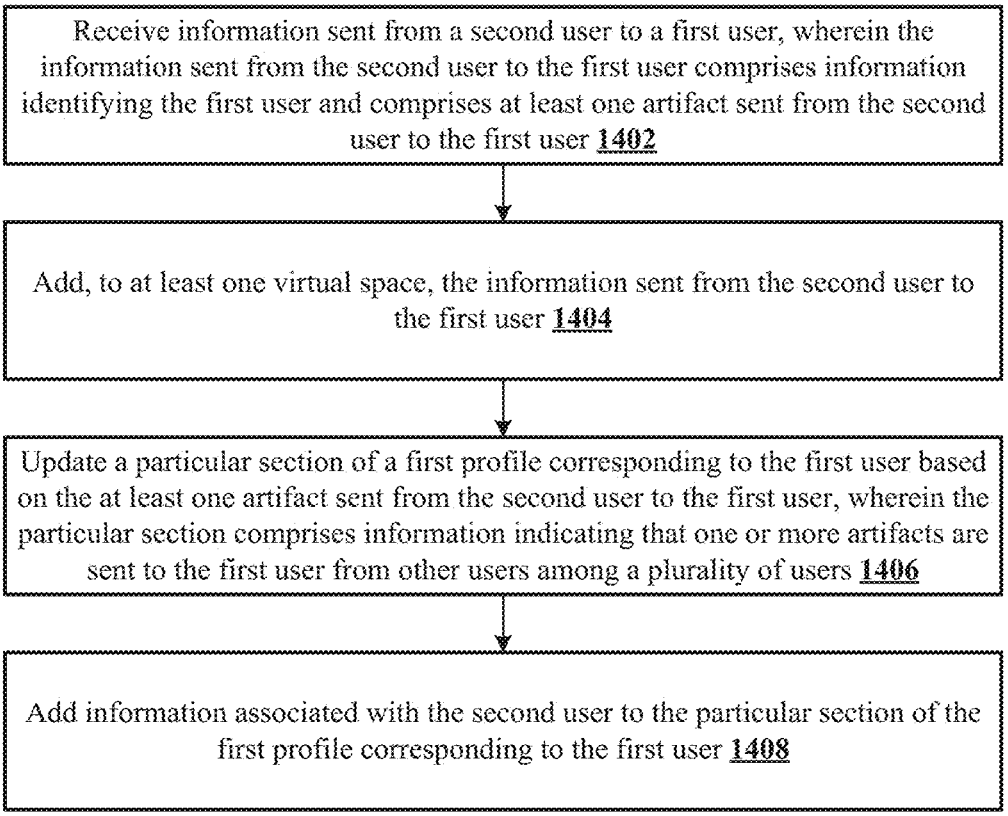
FIG. 14 shows an example process for facilitating communication, which may be performed by a communication system in accordance with the present disclosure.

FIG. 14 illustrates an example process 1400 for facilitating communication, which may be performed by a communication service (e.g., communication service 112) in accordance with the present disclosure. For example, the process 1400 may be utilized to simultaneously communicate the same information via a profile and one or more virtual spaces. As such, the process 1400 facilitates the user's ability to disseminate information to a greater audience. Although depicted as a sequence of operations in FIG. 14, those of ordinary skill in the art will appreciate that various embodiments may add, remove, reorder, or modify the depicted operations.

As described above, a second user may want to send information to a first user. The information may include, for example, a kudos. At 1402, information sent from a second user to a first user may be received. The information sent from the second user to the first user can comprise information identifying the first user (such as identifying the first user as the recipient of the kudos). The information sent from the second user to the first user can additionally, or alternatively, comprise at least one artifact sent from the second user to the first user. The at least one artifact ma include a message and a computer-generated graphic image. For example, the kudos 1102 as shown in FIG. 11 comprises both a graphic image of the word "KUDOS!" and a message beneath the graphic image.

The kudos may be simultaneously or synchronously published on the first profile associated with the first user and/or in a text chat in the virtual space(s). At 1404, the information sent from the second user to the first user may be added to at least one virtual space. At 1406, a particular section of a first profile corresponding to the first user may be updated based on the at least one artifact sent from the second user to the first user. The particular section comprises information indicating that one or more artifacts are sent to the first user from other users among a plurality of users. For example, the kudos may be published in a section of the first profile that is dedicated to kudos. Any kudos that the first user has previously received from any other user may be published in the particular section. The kudos may additionally or alternatively be posted in the text chat of a virtual space (such as the text chat of the virtual space that the first user disseminate the profile update information to). At 1408, information associated with the second user may be added to the particular section of the first profile corresponding to the first user. For example, the kudos sent from the second user may be added to the particular section of the first profile.

As described above, existing internet-based communication tools do not provide a means for users to view all upcoming events or meetings schedule by other users. For example, existing internet-based communication tools may only show a user those events or meetings that the user has been invited to or has created (such as via a virtual calendar associated with the user), but the user may not be able to see any activity associated with other upcoming or previous events or meetings. As a result, users of existing internet-based communication tools may miss important opportunities to connect with or communicate with the other users. In embodiments, the communication service 112 remedies this shortcoming of existing internet-based communication tools by providing its users with a better overview of activity associated with upcoming, current, or previous events or meetings.

Figure 15:
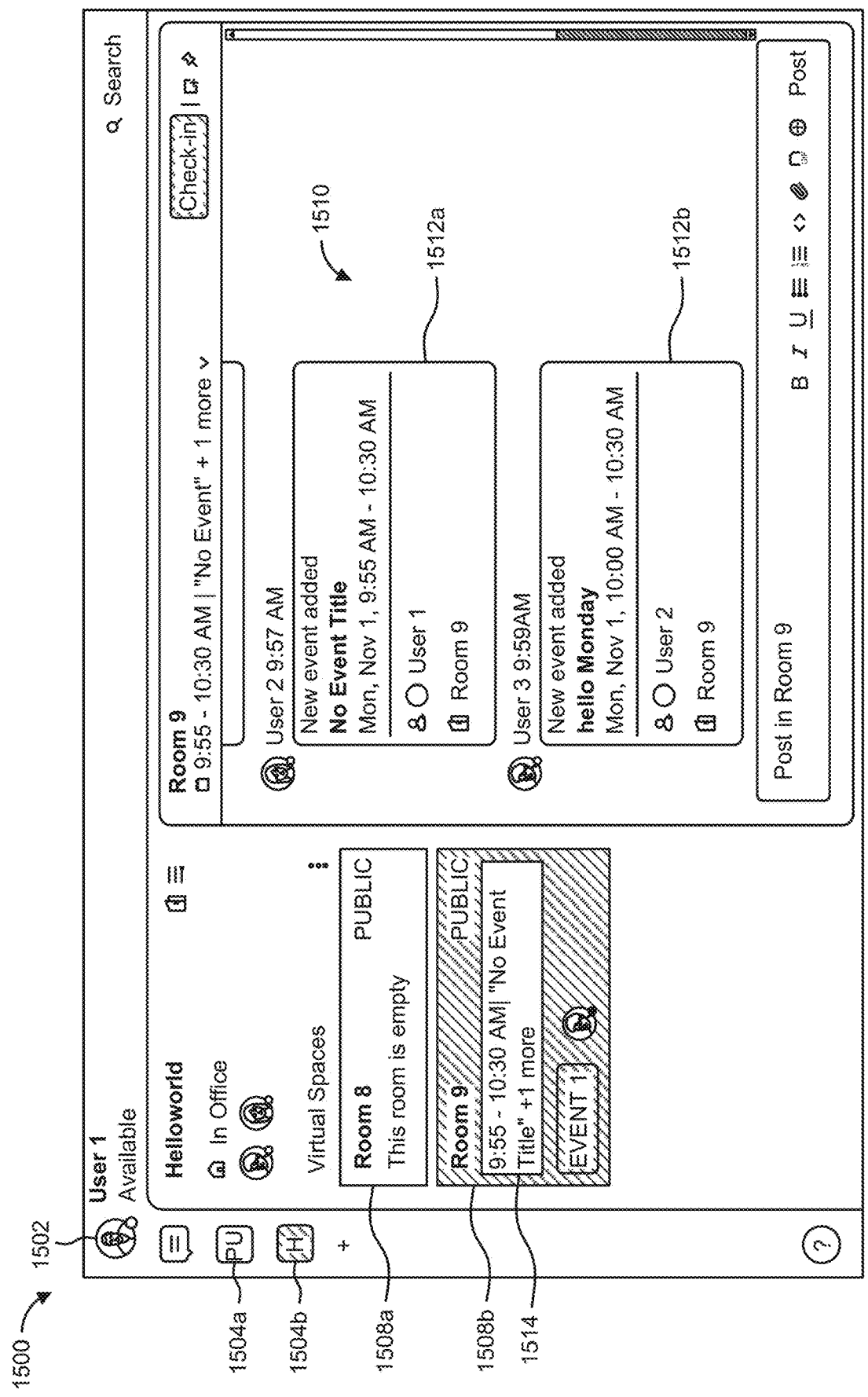
FIG. 15 shows another example user interface for facilitating communication in accordance with the present disclosure.

FIG. 15 shows a UI 1500 depicting a plurality of virtual spaces provided by a communication service (e.g., communication service 112). The UI 1500 may, for example, be displayed on a user device belonging to a user of the communication service associated with the user information 1502. The user information 1502 indicates one or more of a name, a status/availability, and a photo of the user.

As discussed above, in embodiments, the communication service 112 provides one or more offices to the users. Each icon 1504*a-b* on the UI 1500 corresponds to an office. The user associated with the user device on which the UI 1500 is being displayed may select a particular icon 1504*a-b* to join or become associated with the corresponding office. For example, the UI 1500 depicts the icon 1504*b* as being selected. The virtual spaces associated with the office corresponding to the icon 1504*b* are displayed on the UI 1500. For example, the virtual spaces may each be represented by a particular card 1508*a-b*. While the UI 1500 shows the virtual spaces corresponding to the cards 1508*a-b* as belonging to a particular office (e.g., the office corresponding to the icon 1504*b*), it should be appreciated that in other embodiments, the virtual spaces do not belong to any particular office.

The user may select any one of the cards 1508*a-b* to join or become associated with the corresponding virtual space. For example, the user may see that one of the cards 1508*a-b* corresponds to a virtual space that has a name that is of interest to the user, and/or the user may see, via the cards 1508*a-b*, that a person of interest is in one of the virtual spaces. The user may select that card, such as by clicking on that card. For example, if the user selects the card 1508*b*, the user may join or become associated with the virtual space corresponding to the card 1508*b*.

As discussed above, in some embodiments, the users of the communication service 112 do not need permission to join any of the virtual spaces. Instead, the users may freely join and leave the virtual spaces. As depicted by the UI 1500, the virtual spaces corresponding to the cards 1508*a-b* are all public virtual spaces, meaning that the users do not need permission to join any of the virtual spaces corresponding to the cards 1508*a-b*. However, it should be appreciated that in other embodiments, one or more of the virtual spaces may be private virtual spaces. A private virtual space may be a virtual space that has restrictions on which users may view and/or join the virtual space. For example, a private virtual space may be restricted to those users who are participating in a particular meeting. A public virtual space may be changed to a private virtual space, and vice versa.

Each of the virtual spaces corresponding to the cards 1508*a-b* may be associated with an event schedule. The event schedule associated with a virtual space indicates one or more of: events that have taken place in the virtual space, events that will take place in the virtual space, and/or events that are currently taking place in the virtual space. The events indicated by the event schedule associated with the virtual space corresponding to the card 1508*b* are displayed in a text chat 1510 associated with the virtual space corresponding to the card 1508*b*. For example, the events indicated by the event schedule associated with the virtual space corresponding to the card 1508*b* include the events 1512*a-b*. Each of the events 1512*a-b* indicate one or more of: an event title, a time/duration associated with the event, a virtual space (e.g., location) associated with the event, and/or a user that created the event. Any user that joins the virtual space corresponding to the card 1508*b* can scroll through the text chat 1510 to gain a comprehensive understanding of past, current, and future events associated with the virtual space.

In embodiments, one or more of the cards 1508*a-b* includes information indicative of at least one event associated with the corresponding virtual space. For example, the card 1508*b* includes an indication 1514 of an ongoing event that is currently taking place in the virtual space "Team" from 9:55-10:30 AM. The information indicative of the at least one event associated with the corresponding virtual space may not be indicative of every event in the event schedule. For example, if multiple events are associated with the virtual space, only information indicative of the earliest event may be displayed on the card (a +1 may be used to indicate that other events are also ongoing in the virtual space). In some embodiments, a user can see the information indicative of the at least one event on any card regardless of whether he/she joins or checks into that virtual space.

Figure 16:
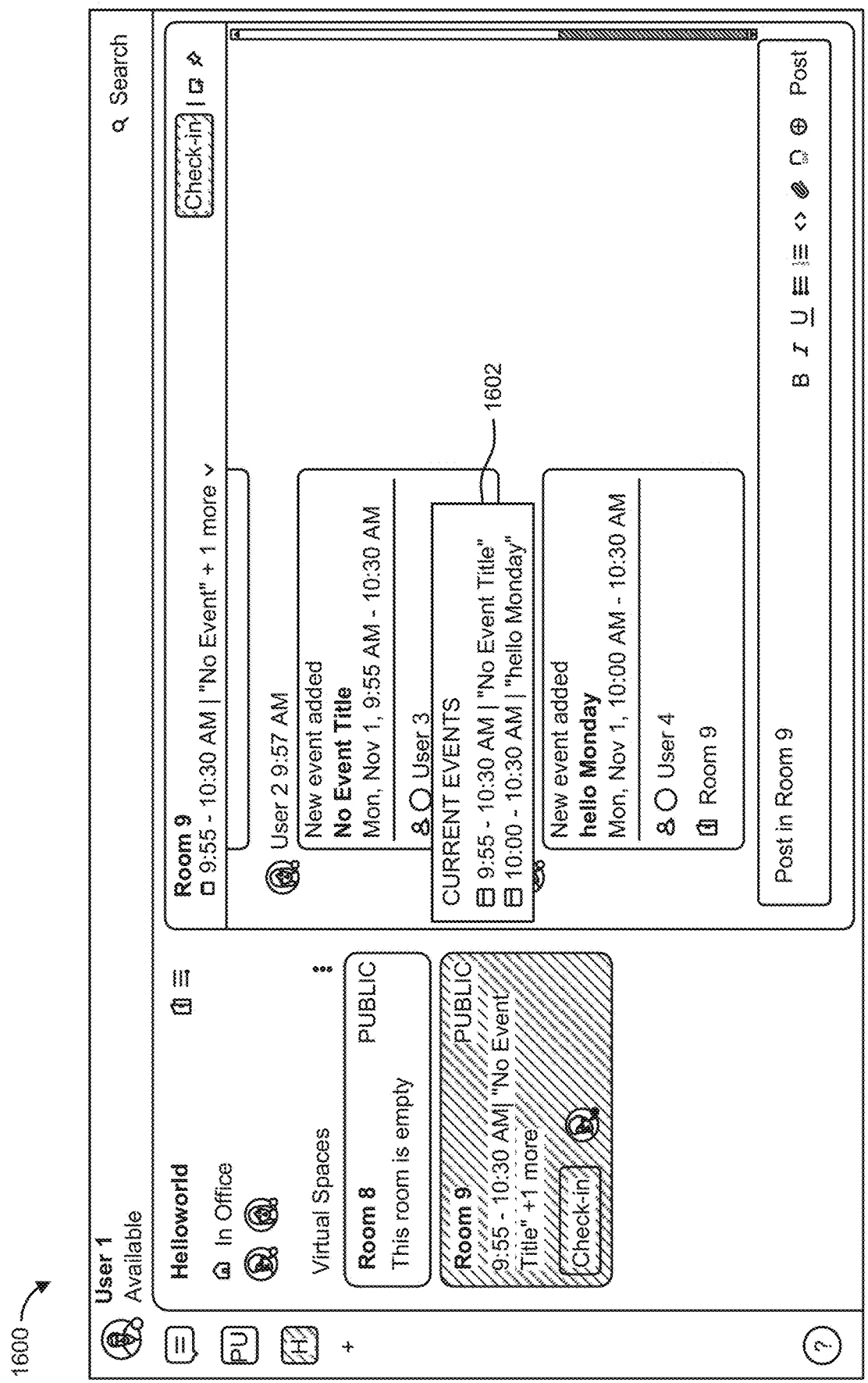
FIG. 16 shows another example user interface for facilitating communication in accordance with the present disclosure.

In embodiments, if the user associated with the user information 1502 hovers over one of the cards 1508*a-b*, additional information, e.g., information indicative of the event schedule is displayed. FIG. 16 shows a UI 1600 depicting additional information 1602 indicative of an event schedule being displayed. For example, the user may hover over the card 1508b if the user is interested in all ongoing events occurring in the virtual space associated with the card 1508b. The additional information 1602 may be displayed on the UI 1500. For example, the additional information 1602 may be displayed next to the card 1508b. The additional information 1602 may include information about additional events that were not indicated directly on the card 1508b and/or may include additional information about events that were indicated directly on the card 1508b. For example, the additional information 1602 may indicate all or some of the events included in the event schedule for that virtual space. The additional information 1602 can include one or more of: times/durations, titles, creator names, and durations associated with each event. In some embodiments, a user can see the additional information indicative of the event schedule regardless of whether he/she joins or checks into that virtual space.

In some embodiments, users associated with a particular virtual space may all want to participate in a live, synchronous communication with one another. However, in some instances, only a portion (e.g., subset) of the users that have been associated with a particular virtual space may want to participate in a live, synchronous communication with one another. For example, if six people are in a particular virtual space, two of the users may want to have a real-time communication with one another, without the other four users. The two users may do so by participating in a live bubble chat. The two users may participate in real-time communication inside the bubble. The bubble may include a communication channel that is not accessible to the third user that is not in the bubble. However, despite only the two users being in the bubble, they are still in the same virtual space as the other four users. Therefore, all six users still may communicate via the communication channel associated with that virtual space. The communication channel associated with the bubble chat may be a sub-channel of the communication channel associated with the virtual space.

Figure 17:
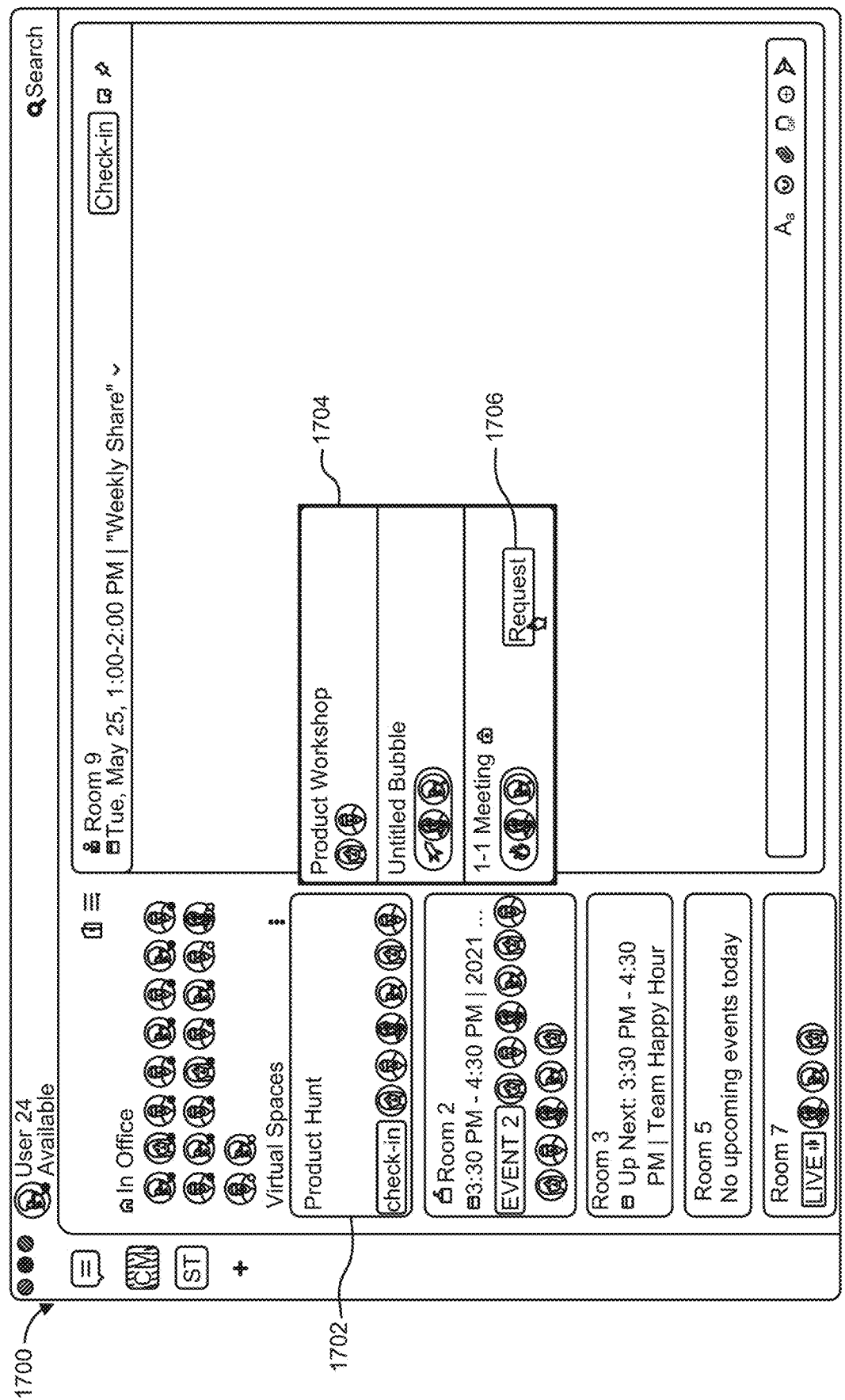
FIG. 17 shows another example user interface for facilitating communication in accordance with the present disclosure.

If a virtual space includes at least one bubble chat, the at least one bubble chat may be indicated by the virtual space card associated with the virtual space. FIG. 17 shows a UI 1700 depicting a virtual space card 1702 associated with a virtual space entitled "Product Hunt." If a user hovers over the virtual room card 1702, a box 1704 may be displayed. The box 1704 indicates the bubble chats that currently exist within the virtual space entitled "Product Hunt." The user may be able to join one of the bubble chats directly from the UI 1700. For example, the user can request to join the bubble chat entitled "1-on-1 meeting" by selecting a button 1706. The user may need to obtain a permission from users who are already in bubble chats to join the bubble chats that are private (e.g., locked), while the user may be able to join public (e.g., unlocked) bubble chats by simply selecting the button 1706 with no need of permission from users already in the bubble chats. Additionally or alternatively, in some embodiments, as shown in 1702, the information of the events may include information about users associated with the virtual space "Product Hunt." For example, those who are associated with the virtual space may be shown on the virtual space card 1702.

In embodiments, if the user associated with the user information 1502 hovers over one of the cards 1508a-b, one or more of an event summary, a bubble summary, or check-in summary (what users are checked-into in the virtual space) may be displayed. For example, one or more of an event summary, a bubble summary, or check-in summary (what users are checked-into in the virtual space) may be displayed without the user ever joining or checking into the virtual space. In this manner, users do not need to enter the virtual space to know that communication within the virtual space is in progress. Instead of displaying only the latest message on the card (the content of this message is limited, and it is difficult to fully understand the important communication information through the latest message), a refined summary of important communication may be displayed when the user mouses over the card. By refining the summary information of important communication, the users may be able to more efficiently obtain important information about the virtual spaces and the communication within the virtual spaces. It can be understood by those skilled in the art that in some embodiments, event summary, such as the one or more of a schedule summary, a bubble summary, or check-in summary, may be displayed on the space cards, as shown on the space card "Room 2" in FIG. 17.

In some embodiments, the displayed important communication summary information can be associated with an entry control. After the entry control is triggered, it may directly locate the participation interface of the important communication information, such as entering the bubble, entering the topic post, opening the task, etc. This may shorten the operation path and further improve communication efficiency for the users. The important communication summary information can include, for example, ongoing events, hot topics for discussion, tasks due today, and/or ongoing group meetings (or bubbles) in a virtual space. Important communication summary information can be displayed in the style specified by the category, and the display styles of different categories can be different. For example: ongoing events, time duration events, time themes, etc. can be displayed, and bubbles in the room, bubble logo, bubble's name, user avatar of the person in the bubble, etc. can be displayed.

In addition to being able to view already-scheduled events associated with the virtual space associated with the card 1508b, the user can create new events associated with the virtual space. For example, a user can create one or more events, scheduled for some time in the future, that will take place in one or more virtual space(s). Each event may be associated with a time and/or a duration. For example, the user that created the event may assign a start time, end time, and/or a duration to the event. If a user creates an event to take place in a virtual space, that new event may be added to the event schedule associated with that virtual space.

Figure 18:
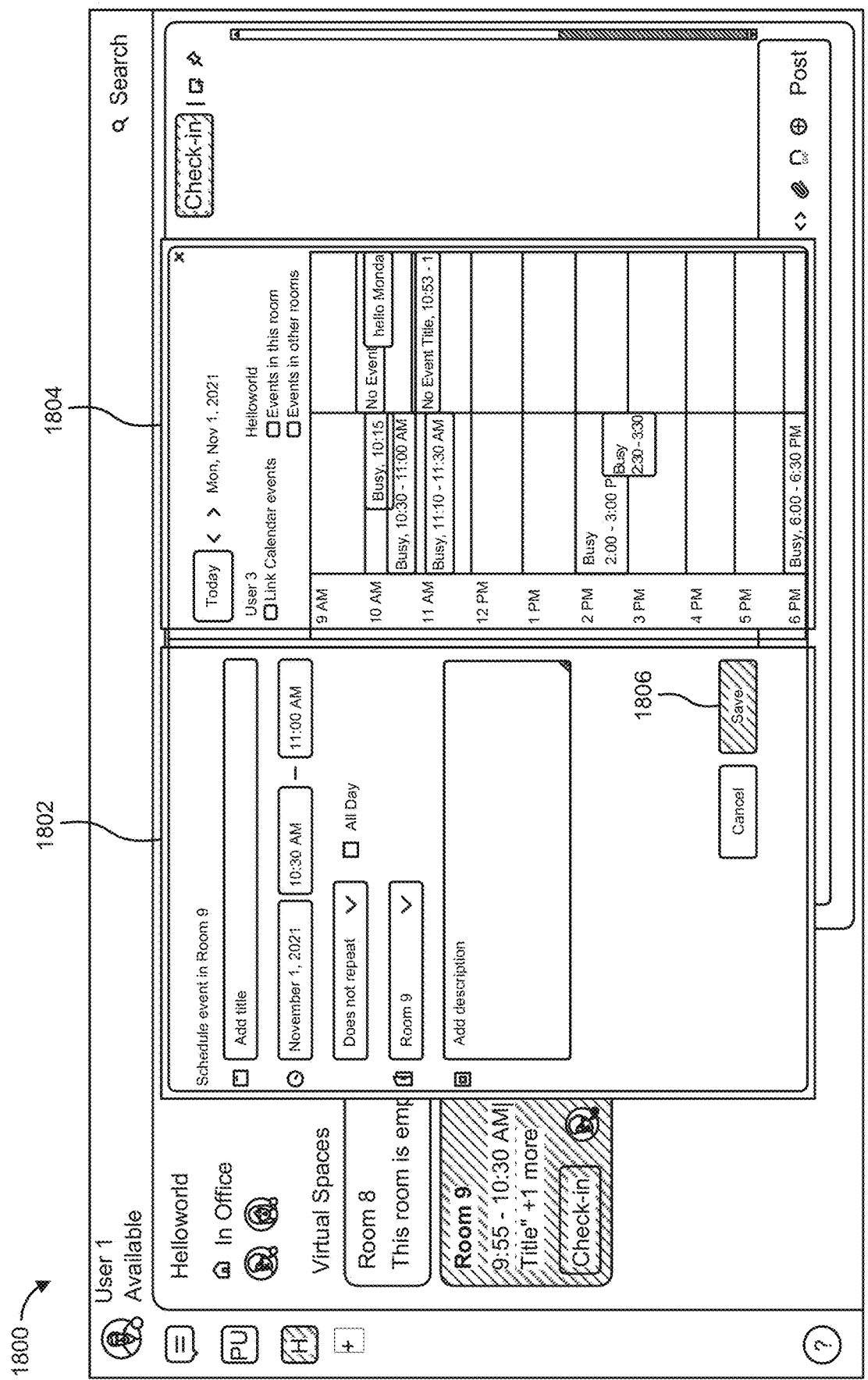
FIG. 18 shows another example user interface for facilitating communication in accordance with the present disclosure.

FIG. 18 shows a UI 1800 depicting a user creating an event within a virtual space. For example, the user can enter, in a first box 1802, information associated with the event that the user wants to create. The user can enter one or more of: a title associated with the event, a date, start time, end time, or duration associated with the event, whether or not the event repeats, a virtual space that the event will occur in, and/or a description of the event. After the user has entered the information associated with the event, the user may select a button 1806 to create the event.

To assist with the event creation, a schedule associated with the user may be displayed on the same UI in a second box 1804. The user schedule may indicate both events associated with the virtual spaces provided by the communication service, as well as events/meetings that the user has that are not associated with the communication service. For example, the left column of the box 1804 indicates events/meetings that the user has scheduled that are not associated with the communication service 112. Rather, those events/ meetings are associated with a different communication service or platform. The communication service 112 may be integrated with the different communication service or platform (e.g., a third-party platform) so that the left column can be displayed. The right column of the box 1804 indicates events/meetings that the user has scheduled that are associated with the communication service 112. For example, the right column of the box 1804 indicates events within a particular virtual space and/or within more than one virtual space. The user may use the information contained in the box 1804 to assist with event creation.

As discussed above with regard to FIG. 15, the events indicated by the event schedule associated with a virtual space are displayed in a text chat 1510 associated with the virtual space. For example, the events indicated by the event schedule associated with the virtual space include the events 1512a-b. Each of the events 1512a-b indicate one or more of: an event title, a time/duration associated with the event, a virtual space (e.g., location) associated with the event, and/or a user that created the event. Any user that joins the virtual space can scroll through the text chat 1510 to gain a comprehensive understanding of past, current, and future events associated with the virtual space.

Figure 19:
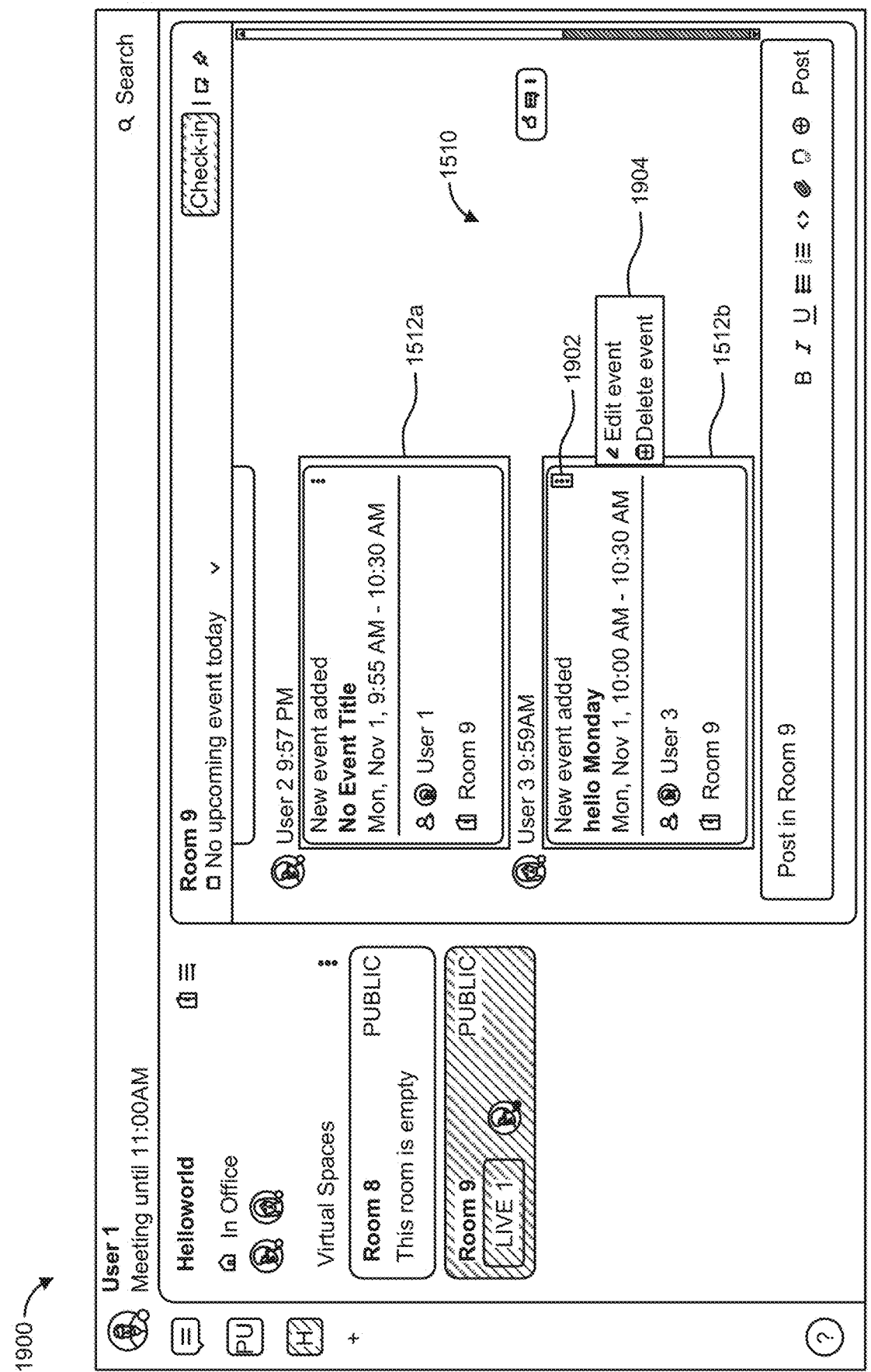
FIG. 19 shows another example user interface for facilitating communication in accordance with the present disclosure.

A user may be able to edit or delete events from the text chat 1510. FIG. 19 shows a UI 1900 depicting the event cards 1512a-b within the text chat 1510. A user may edit or delete one or more of the event cards 1512a-b. For example, to edit the event 1512b, the user may select a button 1902. If the user selects the button 1902, an indication 1904 may be displayed on the UI 1900. From the indication 1904, the user may either delete or edit the event card 1512b. For example, to edit the event card 1512b, the user may select, from the indication 1904, "edit event." If the user selects "edit event," the user may be able to modify a title, location, time, duration, or any other detail associated with the event card 1512b.

A user (whether checked-in or not) can choose to edit any scheduled event. For example, the user can either edit an event previously scheduled by that same user, or the user can edit an event previously scheduled by a different user if the user was granted authority to edit the event. After an event is edited, the edited event will be displayed in the corresponding virtual space, such as in the text chat of the virtual space.

Figure 20:
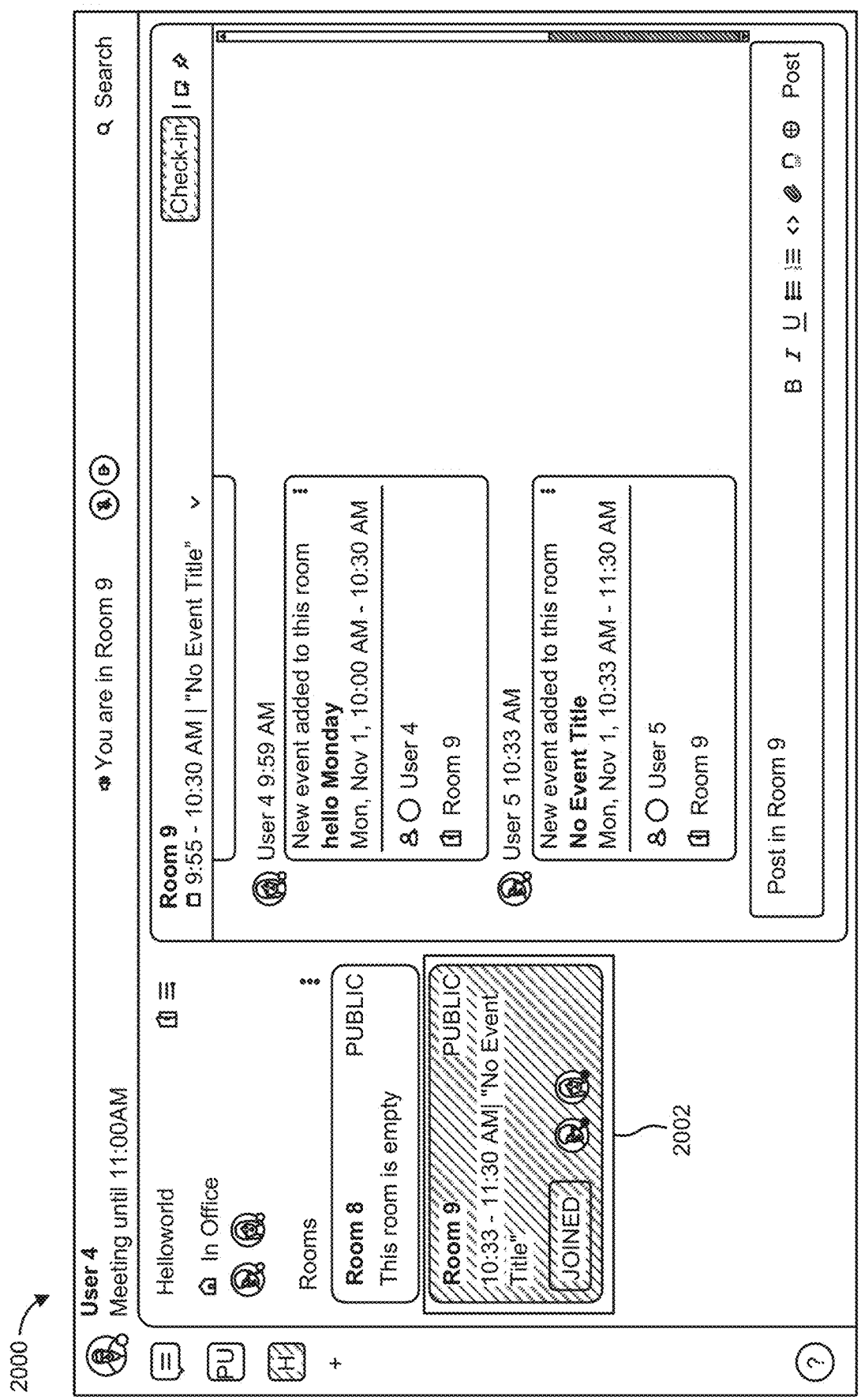
FIG. 20 shows another example user interface for facilitating communication in accordance with the present disclosure.

Users may join a virtual space during an event in the virtual space. For example, in some embodiments, users may check into a virtual space during an event in the virtual space. FIG. 20 shows a UI 2000 depicting users in a virtual space during an event. The Those users who check-into the virtual space during the event (e.g., while the event is ongoing) and/or those users who checked-into the virtual space before the event but kept the "check-in status" during the event will be the participants of the events in this virtual space. The box 2002 indicates that two users are participants of the events in the virtual space depicted by the UI 2000.

FIG. 21 illustrates an example process 2100 for facilitating communication, which may be performed by a communication service (e.g., communication service 112) in accordance with the present disclosure. For example, the process 2100 may be utilized to manage event schedules associated with virtual spaces. Although depicted as a sequence of operations in FIG. 21, those of ordinary skill in the art will appreciate that various embodiments may add, remove, reorder, or modify the depicted operations.

As described above users of the communication service can create events or meetings associated with one or more of the virtual spaces. For example, a user can create one or more events, scheduled for some time in the future, that will take place in one or more virtual space(s). Each event may be associated with a time and/or a duration. Each virtual space may be associated with an event schedule. The event schedule associated with a virtual space indicates one or more of: events that have taken place in the virtual space, events that will take place in the virtual space, and/or events that are currently taking place in the virtual space. Data indicative of the event schedules associated with a plurality of virtual spaces may be maintained or stored, such as in the database(s) 113. At 2102, information about a plurality of virtual spaces may be maintain in at least one database. The information includes a description of at least a first event associated with at least one of the plurality of virtual spaces and a time associated with the first event. A plurality of users may share information via the plurality of virtual spaces. The plurality of users and the plurality of virtual spaces are associated with the collaborative work environment. At 2104, information associated with the at least one of the virtual spaces may be sent to a first user. The first user may be a user of the communication service. The event schedule comprises information indicative of at least one event.

Each of the plurality of virtual spaces may each be represented by a particular card (e.g., cards 1508a-b). At 2106, display of representations (e.g., cards) corresponding to the plurality of virtual spaces may be caused on a first computing device associated with the first user. One or more of the representations (e.g., cards) include information indicative of at least one event associated with the corresponding virtual space. For example, a card may include an indication of an ongoing event that is currently taking place in the virtual space. The information indicative of the at least one event associated with the corresponding virtual space may not be indicative of every event in the event schedule. For example, if multiple events are associated with the virtual space, only information indicative of the earliest event may be displayed on the card (a +1 may be used to indicate that other events are also ongoing in the virtual space). In some embodiments, a user can see the information indicative of the at least one event on any card regardless of whether he/she joins or checks into that virtual space.

The first user may be interested in having additional information regarding the events associated with a particular virtual space represented by a particular card. For example, the first user may want to see more information that the event information that is already displayed on the card. To do so, the first user can hover over one of the cards.

At 2108, display of at least a portion of the information indicative of the at least one event may be caused. The information indicative of the at least one event may be displayed in at least one representation corresponding to the at least one virtual space on a first computing device associated with a first user. In some embodiments, there may be a plurality of events associated with the at least one virtual space. A first event among the plurality of events may be displayed in the at least one representation corresponding to the at least one virtual space. The other events among the plurality of events may be displayed in an area adjacent to the at least one representation. For example, the area may be a floating window or a pop up adjacent to the space card 1702. The display of the other events among the plurality of events may be caused based on a determination that an indication of interest was received in the at least one of the plurality of virtual spaces by the first user. The determination of the indication of interest is based on first user input provided through a user interface on the first user device. For example, the first user input may include the first user hovering over the card associated with the at least one virtual space.

The at least a portion of the information indicative of the event schedule may include additional information associated with the events in the at least one virtual space (e.g., information that was not already included on the card associated with the virtual space). The at least a portion of the information includes at least the time associated with the first event. For example, at least a portion of the information indicative of the event schedule may indicate all or some of the events included in the event schedule for that virtual space. The at least a portion of the information indicative of the event schedule can include one or more of: times/durations, titles, creator names, and durations associated with each event. In some embodiments, a user can see the at least a portion of the information indicative of the event schedule regardless of whether he/she joins or checks into that virtual space.

Figure 22:
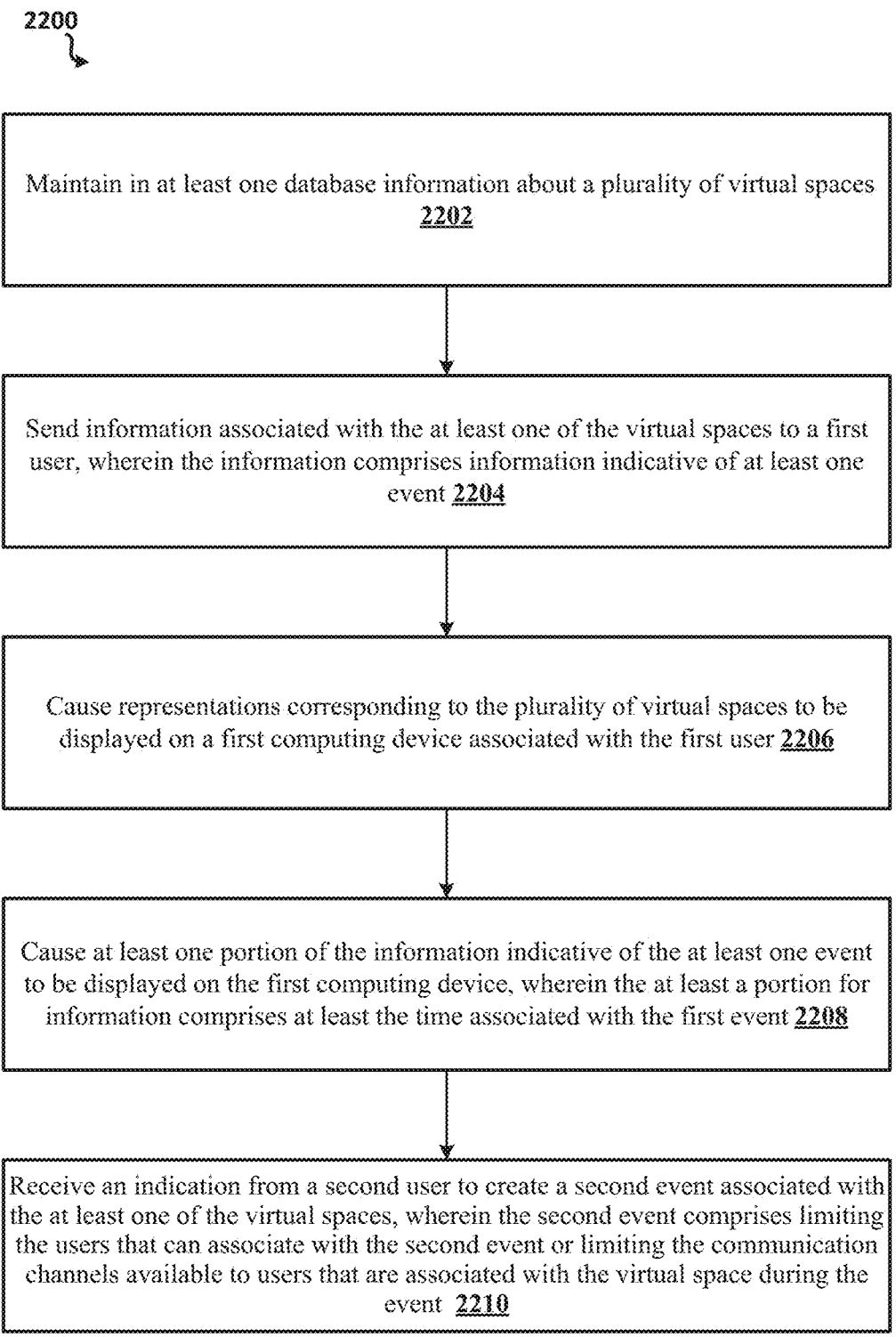
FIG. 22 shows an example process for facilitating communication, which may be performed by a communication system in accordance with the present disclosure.

FIG. 22 illustrates an example process 2200 for facilitating communication, which may be performed by a communication service (e.g., communication service 112) in accordance with the present disclosure. For example, the process 2200 may be utilized to manage event schedules associated with virtual spaces. Although depicted as a sequence of operations in FIG. 22, those of ordinary skill in the art will appreciate that various embodiments may add, remove, reorder, or modify the depicted operations.

As described above users of the communication service can create events or meetings associated with one or more of the virtual spaces. For example, a user can create one or more events, scheduled for some time in the future, that will take place in one or more virtual space(s). Each event may be associated with a time and/or a duration. Each virtual space may be associated with an event schedule. The event schedule associated with a virtual space indicates one or more of: events that have taken place in the virtual space, events that will take place in the virtual space, and/or events that are currently taking place in the virtual space. Data indicative of the event schedules associated with a plurality of virtual spaces may be maintained or stored, such as in the database(s) 113. At 2202, information about a plurality of virtual spaces may be maintain in at least one database. The information includes a description of at least a first event associated with at least one of the plurality of virtual spaces and a time associated with the first event. At 2204, information indicative of the event schedule for the at least one of the virtual spaces may be sent to a first user. The first user may be a user of the communication service. The event schedule comprises information indicative of at least the first event.

Each of the plurality of virtual spaces may each be represented by a particular card (e.g., cards 1508a-b). At 2206, display of representations (e.g., cards) corresponding to the plurality of virtual spaces may be caused on a first computing device associated with the first user. One or more of the representations (e.g., cards) include information indicative of at least one event associated with the corresponding virtual space. For example, a card may include an indication of an ongoing event that is currently taking place in the virtual space. The information indicative of the at least one event associated with the corresponding virtual space may not be indicative of every event in the event schedule. For example, if multiple events are associated with the virtual space, only information indicative of the earliest event may be displayed on the card (a +1 may be used to indicate that other events are also ongoing in the virtual space). In some embodiments, a user can see the information indicative of the at least one event on any card regardless of whether he/she joins or checks into that virtual space.

The first user may be interested in having additional information regarding the events associated with a particular virtual space represented by a particular card. For example, the first user may want to see more information that the event information that is already displayed on the card. To do so, the first user can hover over one of the cards.

At 2208, display of at least a portion of the information indicative of the event schedule may be caused. The display may be caused based on a determination that an indication of interest was received in the at least one of the plurality of virtual spaces by the first user. The determination of the indication of interest is based on first user input provided through a user interface on the first user device. For example, the first user input may include the first user hovering over the card associated with the at least one virtual space.

The at least a portion of the information indicative of the event schedule may include additional information associated with the events in the at least one virtual space (e.g., information that was not already included on the card associated with the virtual space). The at least a portion of the information includes at least the time associated with the first event. For example, at least a portion of the information indicative of the event schedule may indicate all or some of the events included in the event schedule for that virtual space. The at least a portion of the information indicative of the event schedule can include one or more of: times/durations, titles, creator names, and durations associated with each event. In some embodiments, a user can see the at least a portion of the information indicative of the event schedule regardless of whether he/she joins or checks into that virtual space.

The users of the communication service can create events or meetings associated with one or more of the virtual spaces. For example, a user can create one or more events, scheduled for some time in the future, that will take place in one or more virtual space(s). At 2210, an indication from a second user to create a second event associated with the at least one of the virtual spaces may be received. The indication may indicate a time and/or a duration associated with the second event. The indication can include the name of the second event, a topic associated with the second event, the location of the second event (e.g., which virtual space the event will take place in), and/or a time or duration associated with the second event. Creating the second event may comprise limiting the users that can associate with the second event. For example, the second user may indicate that the second event is a private event (e.g., users need permission or invitation to attend the event). Uninvited users may be prevented from associating with the at least one of the virtual spaces during the second event. Additionally, or alternatively, creating the second event may comprise limiting the communication channels available to users that are associated with the virtual space during the event. Limiting the communication channels available to users that are associated with the virtual space during the event may comprise preventing a subset of users from sending at least one type of real-time communications. For example, the subset of users may be prevented from speaking during the event. The subset of users may only be able to listen during the event.

Figure 23:
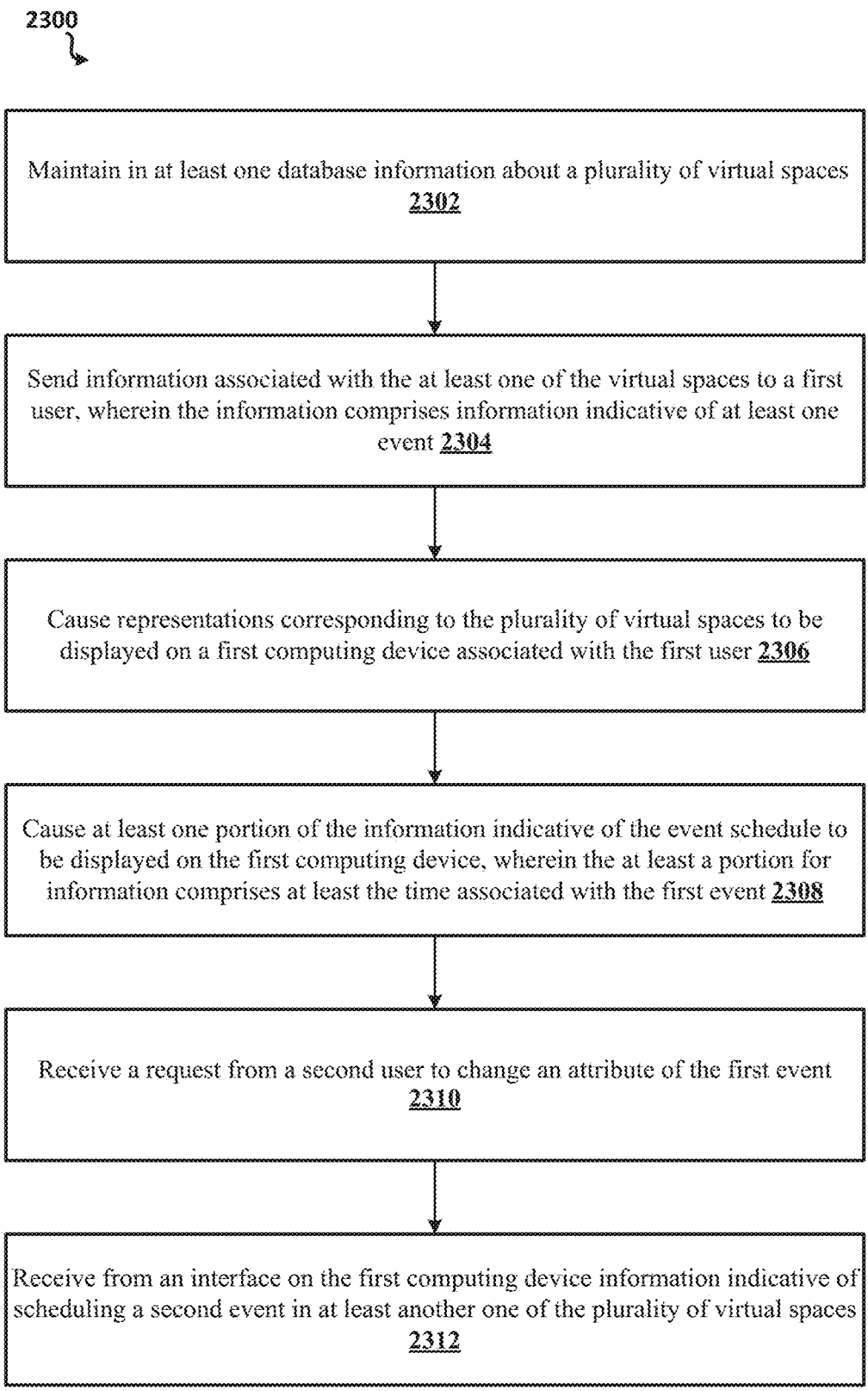
FIG. 23 shows an example process for facilitating communication, which may be performed by a communication system in accordance with the present disclosure.

FIG. 23 illustrates an example process 2300 for facilitating communication, which may be performed by a communication service (e.g., communication service 112) in accordance with the present disclosure. For example, the process 2300 may be utilized to manage event schedules associated with virtual spaces. Although depicted as a sequence of operations in FIG. 23, those of ordinary skill in the art will appreciate that various embodiments may add, remove, reorder, or modify the depicted operations.

As described above users of the communication service can create events or meetings associated with one or more of the virtual spaces. For example, a user can create one or more events, scheduled for some time in the future, that will take place in one or more virtual space(s). Each event may be associated with a time and/or a duration. Each virtual space may be associated with an event schedule. The event schedule associated with a virtual space indicates one or more of: events that have taken place in the virtual space, events that will take place in the virtual space, and/or events that are currently taking place in the virtual space. Data indicative of the event schedules associated with a plurality of virtual spaces may be maintained or stored, such as in the database(s) 113. At 2302, information about a plurality of virtual spaces may be maintain in at least one database. The information includes a description of at least a first event associated with at least one of the plurality of virtual spaces and a time associated with the first event. At 2304, information indicative of the event schedule for the at least one of the virtual spaces may be sent to a first user. The first user may be a user of the communication service. The event schedule comprises information indicative of at least the first event.

Each of the plurality of virtual spaces may each be represented by a particular card (e.g., cards 1508*a-b*). At 2306, display of representations (e.g., cards) corresponding to the plurality of virtual spaces may be caused on a first computing device associated with the first user. One or more of the representations (e.g., cards) include information indicative of at least one event associated with the corresponding virtual space. For example, a card may include an indication of an ongoing event that is currently taking place in the virtual space. The information indicative of the at least one event associated with the corresponding virtual space may not be indicative of every event in the event schedule. For example, if multiple events are associated with the virtual space, only information indicative of the earliest event may be displayed on the card (a +1 may be used to indicate that other events are also ongoing in the virtual space). In some embodiments, a user can see the information indicative of the at least one event on any card regardless of whether he/she joins or checks into that virtual space.

The first user may be interested in having additional information regarding the events associated with a particular virtual space represented by a particular card. For example, the first user may want to see more information that the event information that is already displayed on the card. To do so, the first user can hover over one of the cards.

At 2308, display of at least a portion of the information indicative of the event schedule may be caused. The display may be caused based on a determination that an indication of interest was received in the at least one of the plurality of virtual spaces by the first user. The determination of the indication of interest is based on first user input provided through a user interface on the first user device. For example, the first user input may include the first user hovering over the card associated with the at least one virtual space.

The at least a portion of the information indicative of the event schedule may include additional information associated with the events in the at least one virtual space (e.g., information that was not already included on the card associated with the virtual space). The at least a portion of the information includes at least the time associated with the first event. For example, at least a portion of the information indicative of the event schedule may indicate all or some of the events included in the event schedule for that virtual space. The at least a portion of the information indicative of the event schedule can include one or more of: times/ durations, titles, creator names, and durations associated with each event. In some embodiments, a user can see the at least a portion of the information indicative of the event schedule regardless of whether he/she joins or checks into that virtual space.

A user (whether checked-in or not) can choose to edit any scheduled event. For example, the user can either edit an event previously scheduled by that same user, or the user can edit an event previously scheduled by a different user if the user was granted authority to edit the event. At 2310, a request to change an attribute of the first event may be received from a second user. The second user may not have created the event. The attribute may include a title, location, time, duration, or any other detail associated with the first event. After the first event is edited, the edited event will be displayed in the corresponding virtual space, such as in the text chat of the virtual space.

The users of the communication service can create events or meetings associated with one or more of the virtual spaces. For example, a user can create one or more events, scheduled for some time in the future, that will take place in one or more virtual space(s). At 2312, information indicative of scheduling a second event in at least another one of the plurality of virtual spaces (a virtual space that is different from the first virtual space) may be received from an interface on the first computing device. The information may indicate a time and/or a duration associated with the second event. The indication can include the name of the second event, a topic associated with the second event, the location of the second event (e.g., which virtual space the event will take place in), and/or a time or duration associated with the second event.

FIG. 24 illustrates an example process 2400 for facilitating communication, which may be performed by a communication service (e.g., communication service 112) in accordance with the present disclosure. For example, the process 2400 may be utilized to manage event schedules associated with virtual spaces. Although depicted as a sequence of operations in FIG. 24, those of ordinary skill in the art will appreciate that various embodiments may add, remove, reorder, or modify the depicted operations.

As described above users of the communication service can create events or meetings associated with one or more of the virtual spaces. For example, a user can create one or more events, scheduled for some time in the future, that will take place in one or more virtual space(s). Each event may be associated with a time and/or a duration. Each virtual space may be associated with an event schedule. The event schedule associated with a virtual space indicates one or more of: events that have taken place in the virtual space, events that will take place in the virtual space, and/or events that are currently taking place in the virtual space. Data indicative of the event schedules associated with a plurality of virtual spaces may be maintained or stored, such as in the database(s) 113. At 2402, information about a plurality of virtual spaces may be maintain in at least one database. The information includes a description of at least a first event associated with at least one of the plurality of virtual spaces and a time associated with the first event. At 2404, information indicative of the event schedule for the at least one of the virtual spaces may be sent to a first user. The first user may be a user of the communication service. The event schedule comprises information indicative of at least the first event.

Each of the plurality of virtual spaces may each be represented by a particular card (e.g., cards 1508*a-b*). At 2406, display of representations (e.g., cards) corresponding to the plurality of virtual spaces may be caused on a first computing device associated with the first user. One or more of the representations (e.g., cards) include information indicative of at least one event associated with the corresponding virtual space. For example, a card may include an indication of an ongoing event that is currently taking place in the virtual space. The information indicative of the at least one event associated with the corresponding virtual space may not be indicative of every event in the event schedule. For example, if multiple events are associated with the virtual space, only information indicative of the earliest event may be displayed on the card (a +1 may be used to indicate that other events are also ongoing in the virtual space). In some embodiments, a user can see the information indicative of the at least one event on any card regardless of whether he/she joins or checks into that virtual space.

The first user may be interested in having additional information regarding the events associated with a particular virtual space represented by a particular card. For example, the first user may want to see more information that the event information that is already displayed on the card. To do so, the first user can hover over one of the cards.

At 2408, display of at least a portion of the information indicative of the event schedule may be caused. The display may be caused based on a determination that an indication of interest was received in the at least one of the plurality of virtual spaces by the first user. The determination of the indication of interest is based on first user input provided through a user interface on the first user device. For example, the first user input may include the first user hovering over the card associated with the at least one virtual space.

The at least a portion of the information indicative of the event schedule may include additional information associated with the events in the at least one virtual space (e.g., information that was not already included on the card associated with the virtual space). The at least a portion of the information includes at least the time associated with the first event. For example, at least a portion of the information indicative of the event schedule may indicate all or some of the events included in the event schedule for that virtual space. The at least a portion of the information indicative of the event schedule can include one or more of: times/durations, titles, creator names, and durations associated with each event. In some embodiments, a user can see the at least a portion of the information indicative of the event schedule regardless of whether he/she joins or checks into that virtual space.

A user may receive notifications or messages when a new event is added to an event schedule associated with a virtual space (e.g., when a new event is scheduled in that virtual space). For example, a user can receive notifications or messages when a new event is scheduled in any virtual space in any office. In some embodiments, for a user to receive notifications or messages when a new event is added to the event schedule, those users may need to subscribe to a specific virtual space's events or event schedule. Similarly, users may subscribe to a particular type of event. At 2410, an indication from a second user to subscribe to the at least one of the virtual spaces may be received. The second user may subscribe, for example, to receive notifications regarding all new events created in the at least one of the virtual spaces.

The creation of a new event in a particular virtual space may prompt the sending of a notification to the second user. At 2412, an indication may be sent to the second user after another event is added to the calendar of the at least one of the virtual spaces. The second user may receive the indication, and as a result, may be made aware of the upcoming events in the virtual space. The second user may decide to join the event, or the second user may decide that he or she does not want to join the event.

Figure 25:
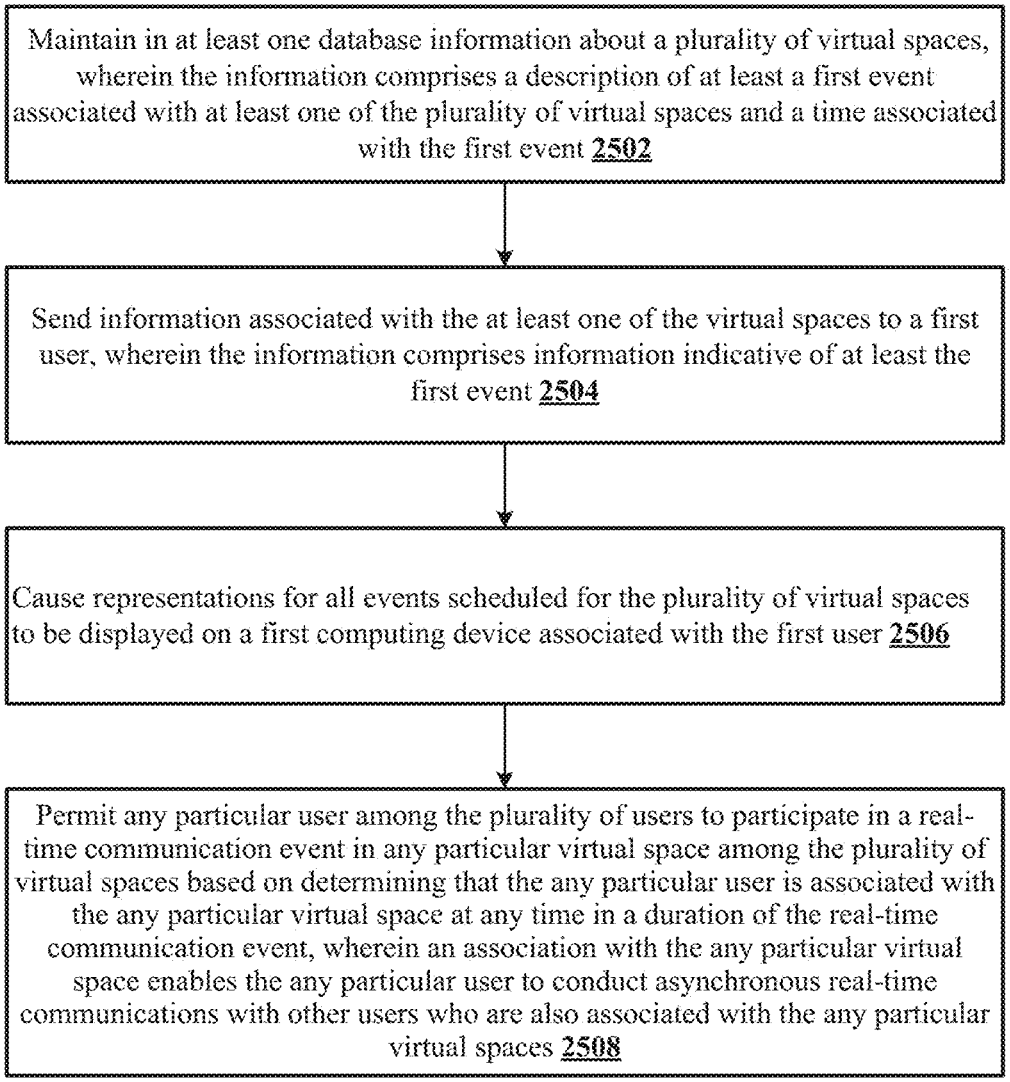
FIG. 25 shows an example process for facilitating communication, which may be performed by a communication system in accordance with the present disclosure.

FIG. 25 illustrates an example process 2500 for facilitating communication, which may be performed by a communication service (e.g., communication service 112) in accordance with the present disclosure. For example, the process 2500 may be utilized to manage event schedules associated with virtual spaces. Although depicted as a sequence of operations in FIG. 25, those of ordinary skill in the art will appreciate that various embodiments may add, remove, reorder, or modify the depicted operations.

As described above users of the communication service can create events or meetings associated with one or more of the virtual spaces. For example, a user can create one or more events, scheduled for some time in the future, that will take place in one or more virtual space(s). Each event may be associated with a time and/or a duration. Each virtual space may be associated with an event schedule. The event schedule associated with a virtual space indicates one or more of: events that have taken place in the virtual space, events that will take place in the virtual space, and/or events that are currently taking place in the virtual space. Data indicative of the event schedules associated with a plurality of virtual spaces may be maintained or stored, such as in the database(s) 113. At 2502, information about a plurality of virtual spaces may be maintain in at least one database. The information includes a description of at least a first event associated with at least one of the plurality of virtual spaces and a time associated with the first event. At 2504, information indicative of the event schedule for at least one of the virtual spaces may be sent to a first user. The first user may be a user of the communication service. The event schedule comprises information indicative of at least the first event.

Figure 26:
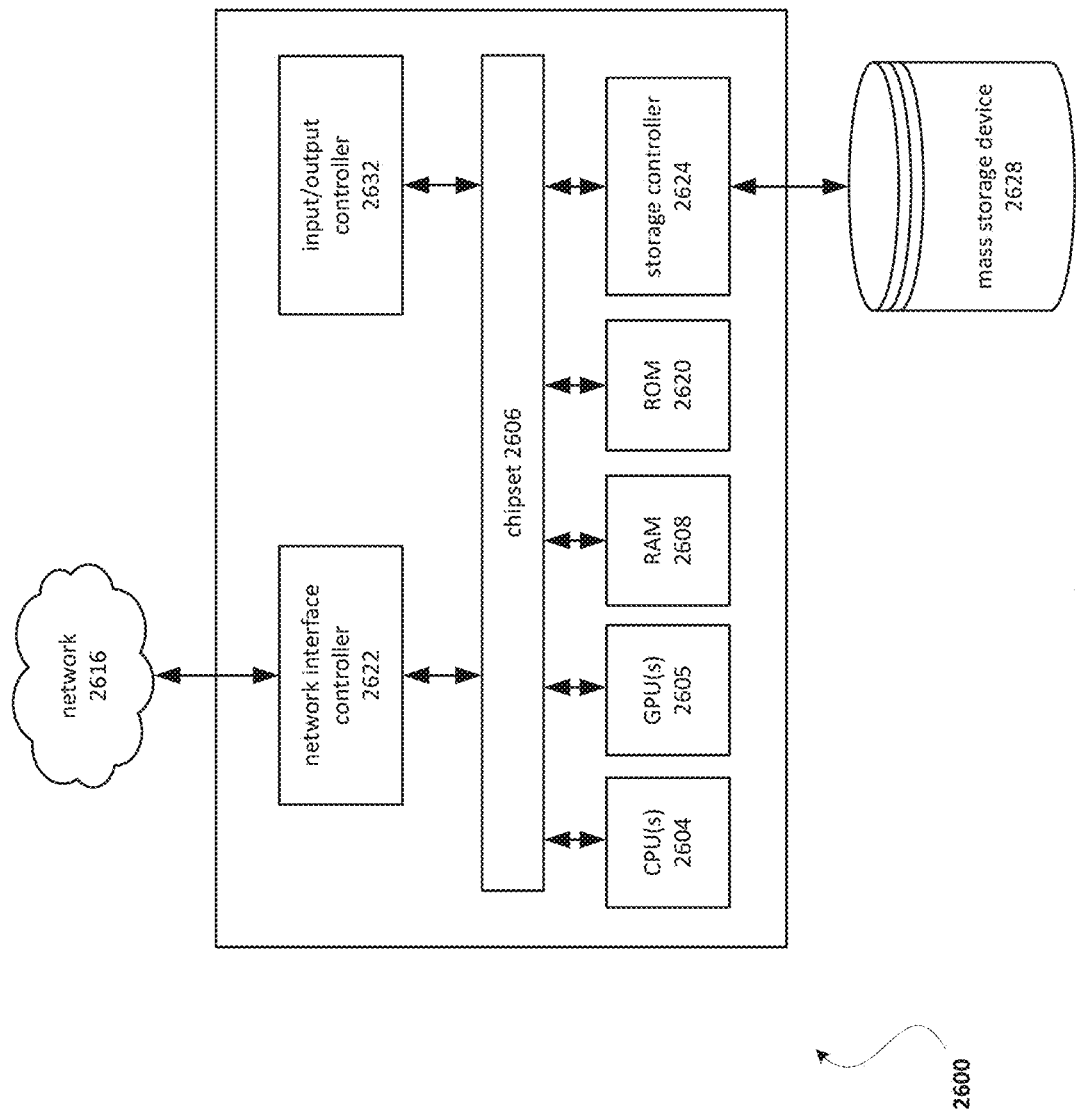
FIG. 26 shows an example computing device which may be used to perform any of the techniques disclosed herein.

The events indicated by the event schedule associated with each virtual space may be displayed in a text chat associated with the corresponding virtual space. At 2506, display of representations for all events scheduled for the plurality of virtual spaces may be caused on a first computing device associated with the first user. For example, as discussed above with regard to FIG. 15, the events indicated by the event schedule associated with the virtual space corresponding to the card 1508*b* include the events 1512*a-b*. Each of the events 1512*a-b* indicate one or more of: an event title, a time/duration associated with the event, a virtual space (e.g., location) associated with the event, and/or a user that created the event. Any user that joins the virtual space corresponding to the card 1508*b* can scroll through the text chat 1510 to gain a comprehensive understanding of past, current, and future events associated with the virtual space. At 2508, a request from any particular user among a plurality of users may be received. The request may be a request to associate with any particular virtual space among a plurality of virtual spaces. The association with any particular virtual space enables the any particular user to conduct asynchronous real-time communications with other users who are also associated with the any particular virtual spaces. The any particular user is permitted to participate in a real-time communication event in the any particular virtual space based on determining that the any particular user is associated with the any particular virtual space at any time in a duration of the real-time communication event. FIG. 26 illustrates a computing device that may be used in various aspects, such as the services, networks, modules, and/or devices depicted in FIG. 1. With regard to the example architecture of FIG. 1, the cloud network 102, user device 104a-d (collectively user device 104), communication service 112, database(s) 113, and/or network 120 may each be implemented by one or more instance of a computing device 2600 of FIG. 26. Likewise, with regard to the example architecture of FIG. 2, the authentications service 226, the management service 223 (and any of its components), the chat service 222, and/or the video conference service 253 may each be implemented by one or more instance of a computing device 2600 of FIG. 26.

The computer architecture shown in FIG. 26 shows a conventional server computer, workstation, desktop computer, laptop, tablet, network appliance, PDA, e-reader, digital cellular phone, or other computing node, and may be utilized to execute any aspects of the computers described herein, such as to implement the methods described herein.

The computing device 2600 may include a baseboard, or "motherboard," which is a printed circuit board to which a multitude of components or devices may be connected by way of a system bus or other electrical communication paths. One or more central processing units (CPUs) 2604 may operate in conjunction with a chipset 2606. The CPU(s) 2604 may be standard programmable processors that perform arithmetic and logical operations necessary for the operation of the computing device 2600.

The CPU(s) 2604 may perform the necessary operations by transitioning from one discrete physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits including registers, adders-subtractors, arithmetic logic units, floating-point units, and the like.

The CPU(s) 2604 may be augmented with or replaced by other processing units, such as GPU(s) 2605. The GPU(s) 2605 may comprise processing units specialized for but not necessarily limited to highly parallel computations, such as graphics and other visualization-related processing.

A chipset 2606 may provide an interface between the CPU(s) 2604 and the remainder of the components and devices on the baseboard. The chipset 2606 may provide an interface to a random-access memory (RAM) 2608 used as the main memory in the computing device 2600. The chipset 2606 may further provide an interface to a computer-readable storage medium, such as a read-only memory (ROM) 2620 or non-volatile RAM (NVRAM) (not shown), for storing basic routines that may help to start up the computing device 2600 and to transfer information between the various components and devices. ROM 2620 or NVRAM may also store other software components necessary for the operation of the computing device 2600 in accordance with the aspects described herein.

The computing device 2600 may operate in a networked environment using logical connections to remote computing nodes and computer systems through local area network (LAN). The chipset 2606 may include functionality for providing network connectivity through a network interface controller (NIC) 2622, such as a gigabit Ethernet adapter. A NIC 2622 may be capable of connecting the computing device 2600 to other computing nodes over a network 2616. It should be appreciated that multiple NICs 2622 may be present in the computing device 2600, connecting the computing device to other types of networks and remote computer systems.

The computing device 2600 may be connected to a mass storage device 2628 that provides non-volatile storage for the computer. The mass storage device 2628 may store system programs, application programs, other program modules, and data, which have been described in greater detail herein. The mass storage device 2628 may be connected to the computing device 2600 through a storage controller 2624 connected to the chipset 2606. The mass storage device 2628 may consist of one or more physical storage units. The mass storage device 2628 may comprise a management component 2610. A storage controller 2624 may interface with the physical storage units through a serial attached SCSI (SAS) interface, a serial advanced technology attachment (SATA) interface, a fiber channel (FC) interface, or other type of interface for physically connecting and transferring data between computers and physical storage units.

The computing device 2600 may store data on the mass storage device 2628 by transforming the physical state of the physical storage units to reflect the information being stored. The specific transformation of a physical state may depend on various factors and on different implementations of this description. Examples of such factors may include, but are not limited to, the technology used to implement the physical storage units and whether the mass storage device 2628 is characterized as primary or secondary storage and the like.

For example, the computing device 2600 may store information to the mass storage device 2628 by issuing instructions through a storage controller 2624 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computing device 2600 may further read information from the mass storage device 2628 by detecting the physical states or characteristics of one or more particular locations within the physical storage units.

In addition to the mass storage device 2628 described above, the computing device 2600 may have access to other computer-readable storage media to store and retrieve information, such as program modules, data structures, or other data. It should be appreciated by those skilled in the art that computer-readable storage media may be any available media that provides for the storage of non-transitory data and that may be accessed by the computing device 2600.

By way of example and not limitation, computer-readable storage media may include volatile and non-volatile, transitory computer-readable storage media and non-transitory computer-readable storage media, and removable and non-removable media implemented in any method or technology. Computer-readable storage media includes, but is not limited to, RAM, ROM, erasable programmable ROM ("EPROM"), electrically erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage, other magnetic storage devices, or any other medium that may be used to store the desired information in a non-transitory fashion.

A mass storage device, such as the mass storage device 2628 depicted in FIG. 26, may store an operating system utilized to control the operation of the computing device 2600. The operating system may comprise a version of the LINUX operating system. The operating system may comprise a version of the WINDOWS SERVER operating system from the MICROSOFT Corporation. According to further aspects, the operating system may comprise a version of the UNIX operating system. Various mobile phone operating systems, such as IOS and ANDROID, may also be utilized. It should be appreciated that other operating systems may also be utilized. The mass storage device 2628 may store other system or application programs and data utilized by the computing device 2600.

The mass storage device 2628 or other computer-readable storage media may also be encoded with computer-executable instructions, which, when loaded into the computing device 2600, transforms the computing device from a general-purpose computing system into a special-purpose computer capable of implementing the aspects described herein. These computer-executable instructions transform the computing device 2600 by specifying how the CPU(s) 2604 transition between states, as described above. The computing device 2600 may have access to computer-readable storage media storing computer-executable instructions, which, when executed by the computing device 2600, may perform the methods described herein.

A computing device, such as the computing device 2600 depicted in FIG. 26, may also include an input/output controller 2632 for receiving and processing input from a number of input devices, such as a keyboard, a mouse, a touchpad, a touch screen, an electronic stylus, or other type of input device. Similarly, an input/output controller 2632 may provide output to a display, such as a computer monitor, a flat-panel display, a digital projector, a printer, a plotter, or other type of output device. It will be appreciated that the computing device 2600 may not include all of the components shown in FIG. 26, may include other components that are not explicitly shown in FIG. 26, or may utilize an architecture completely different than that shown in FIG. 26.

As described herein, a computing device may be a physical computing device, such as the computing device 2600 of FIG. 26. A computing node may also include a virtual machine host process and one or more virtual machine instances. Computer-executable instructions may be executed by the physical hardware of a computing device indirectly through interpretation and/or execution of instructions stored and executed in the context of a virtual machine.

It is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Components are described that may be used to perform the described methods and systems. When combinations, subsets, interactions, groups, etc., of these components are described, it is understood that while specific references to each of the various individual and collective combinations and permutations of these may not be explicitly described, each is specifically contemplated and described herein, for all methods and systems. This applies to all aspects of this application including, but not limited to, operations in described methods. Thus, if there are a variety of additional operations that may be performed it is understood that each of these additional operations may be performed with any specific embodiment or combination of embodiments of the described methods.

The present methods and systems may be understood more readily by reference to the following detailed description of preferred embodiments and the examples included therein and to the Figures and their descriptions.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, may be implemented by computer program instructions. These computer program instructions may be loaded on a general-purpose computer, special-purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that may direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

The various features and processes described above may be used independently of one another, or may be combined in various ways. All possible combinations and sub-combinations are intended to fall within the scope of this disclosure. In addition, certain methods or process blocks may be omitted in some implementations. The methods and processes described herein are also not limited to any particular sequence, and the blocks or states relating thereto may be performed in other sequences that are appropriate. For example, described blocks or states may be performed in an order other than that specifically described, or multiple blocks or states may be combined in a single block or state. The example blocks or states may be performed in serial, in parallel, or in some other manner. Blocks or states may be added to or removed from the described example embodiments. The example systems and components described herein may be configured differently than described. For example, elements may be added to, removed from, or rearranged compared to the described example embodiments.

It will also be appreciated that various items are illustrated as being stored in memory or on storage while being used, and that these items or portions thereof may be transferred between memory and other storage devices for purposes of memory management and data integrity. Alternatively, in other embodiments, some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits ("ASICs"), standard integrated circuits, controllers (e.g., by executing appropriate instructions, and including microcontrollers and/or embedded controllers), field-programmable gate arrays ("FPGAs"), complex programmable logic devices ("CPLDs"), etc. Some or all of the modules, systems, and data structures may also be stored (e.g., as software instructions or structured data) on a computer-readable medium, such as a hard disk, a memory, a network, or a portable media article to be read by an appropriate device or via an appropriate connection. The systems, modules, and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its operations be performed in a specific order. Accordingly, where a method claim does not actually recite an order to be followed by its operations or it is not otherwise specifically stated in the claims or descriptions that the operations are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; and the number or type of embodiments described in the specification.

It will be apparent to those skilled in the art that various modifications and variations may be made without departing from the scope or spirit of the present disclosure. Other embodiments will be apparent to those skilled in the art from consideration of the specification and practices described herein. It is intended that the specification and example figures be considered as exemplary only, with a true scope and spirit being indicated by the following claims.

What is claimed is:

1. A system of facilitating a collaborative work environment, comprising:
at least one memory; and
at least one processor in communication with the at least one memory, wherein instructions stored in the at least one memory upon execution by the at least one processor cause the system to perform operations comprising:
maintaining in at least one database information about a plurality of virtual spaces, wherein a plurality of users share information via the plurality of virtual spaces, and wherein the plurality of users and the plurality of virtual spaces are associated with the collaborative work environment;
causing a plurality of cards to be simultaneously displayed on a first computing device associated with a first user, wherein the plurality of cards are representatives of the plurality of virtual spaces, wherein each of the plurality of cards is configured to enable display of an event schedule associated with a corresponding virtual space among the plurality of virtual spaces, and wherein the event schedule indicates one or more events that have taken place, will take place, or are currently taking place in a corresponding virtual space among the plurality of virtual spaces;
sending information associated with the plurality of virtual spaces to the first computing device, wherein the information comprises information indicative of the event schedule; and
causing at least one portion of the information associated with the plurality of virtual spaces to be displayed in the plurality of cards on the first computing device, wherein the at least one portion of the information comprises a time associated with at least one event indicated by the event schedule and information about users associated with at least a subset of the plurality of virtual spaces, wherein the causing at least one portion of the information associated with the plurality of virtual spaces to be displayed in the plurality of cards on the first computing device further comprises:

causing to display the time associated with at least one event indicated by the event schedule inside the one of the plurality of cards, and causing to display the information about the users associated with the at least a subset of the plurality of virtual spaces inside at least a subset of the plurality of cards that are representatives of the at least a subset of the plurality of virtual spaces.

2. The system of claim 1, wherein the at least one event comprises a plurality of events, and wherein the operations further comprise:

causing information indicative of a first event among the plurality of events to be displayed in at least one card among the plurality of cards; and causing information indicative of other events among the plurality of events to be displayed in an area adjacent to the at least one card based on a determination that an indication of interest in the at least one virtual space was received from the first computing device, wherein the indication of interest is determined based on first user input received via a first interface on the first computing device.

3. The system of claim 1, the operations further comprising:

receiving via a second interface on the first computing device information indicative of scheduling a second event in any of the plurality of virtual spaces;

storing the information associated with the second event in the at least one database; and sending a notification about the second event to at least one subset of other client computing devices associated with at least one subset of other users, wherein the at least one subset of other users have permission to access the plurality of virtual spaces.

4. The system of claim 1, the operations further comprising:

receiving an indication from a second user to create a second event associated with the at least one of the plurality of virtual spaces, wherein creating the second event comprises limiting users that can associate with the second event or limiting communication channels available to users that are associated with the at least one of the plurality of virtual spaces during the second event.

5. The system of claim 1, the operations further comprising:

sending an indication of a new event to at least one subset of users among the plurality of users after the new event is added to a calendar of the at least one of the plurality of virtual spaces.

6. The system of claim 1, the operations further comprising:

determining that information indicative of subscribing to any particular virtual space among the plurality of virtual spaces has been received from any particular user among the plurality of users; and sending an indication of a new event to the any particular user after the new event is added to a calendar of the any particular virtual space.

7. The system of claim 1, the operations further comprising:

receiving a request from a second computing device associated with a second user to change an attribute of the at least one first event; and updating the attribute of the at least one first event based on the request from the second user.

8. The system of claim 1, the operations further comprising:

permitting any particular user among the plurality of users to participate in a real-time communication event in any particular virtual space among the plurality of virtual spaces based on determining that the any particular user is associated with the any particular virtual space at any time in a duration of the real-time communication event, wherein an association with the any particular virtual space enables the any particular user to conduct asynchronous real-time communications with other users who are also associated with the any particular virtual spaces.

9. The system of claim 1, the operations further comprising:

causing display of a user schedule associated with the first user, wherein the user schedule indicates a first schedule associated with the plurality of virtual spaces and a second schedule unassociated with the plurality of virtual spaces.

10. A method, comprising:

maintaining in at least one database information about a plurality of virtual spaces, wherein a plurality of users share information via the plurality of virtual spaces, wherein the plurality of users and the plurality of virtual spaces are associated with a collaborative work environment;

causing a plurality of cards to be simultaneously displayed on a first computing device associated with a first user, wherein the plurality of cards are representatives of the plurality of virtual spaces, wherein each of the plurality of cards is confiugred to enable display of an event schedule associated with a corresponding virtual space among the plurality of virtual spaces, and wherein the event schedule indicates one or more events that have taken place, will take place, or are currently taking place in a corresponding virtual space among the plurality of virtual spaces;

sending information associated with the plurality of virtual spaces to the first computing device, wherein the information comprises information indicative of the event schedule; and causing at least one portion of the information associated with the plurality of virtual spaces to be displayed in the plurality of cards on the first computing device, wherein the at least one portion of the information comprises a time associated with at least one event indicated by the event schedule and information about users associated with at least a subset of the plurality of virtual spaces, wherein the causing at least one portion of the information associated with the plurality of virtual spaces to be displayed in the plurality of cards on the first computing device further comprises:

causing to display the time associtaed with at least one event indicatd by the event schedule inside the one of the plurality of cards, and causing to display the information about the users associated with the at least a subset of the plurality of virtual spaces inside at least a subset of the plurality of cards that are representatives of the at least a subset of the plurality of virtual spaces.

11. The method of claim 10, wherein the at least one event comprises a plurality of events, and wherein the operations further comprise:

causing information indicative of a first event among the plurality of events to be displayed in at least one card among the plurality of cards; and causing information indicative of other events among the plurality of events to be displayed in an area adjacent to the at least one card based on a determination that an indication of interest in the at least one virtual space was received from the first computing device, wherein the indication of interest is determined based on first user input received via a first interface on the first computing device.

12. The method of claim 10, further comprising:
receiving via a second interface on the first computing device information indicative of scheduling a second event in any of the plurality of virtual spaces;
storing the information associated with the second event in the at least one database; and
sending a notification about the second event to at least one subset of other client computing devices associated with at least one subset of other users, wherein the at least one subset of other users have permission to access the plurality of virtual spaces.

13. The method of claim 10, further comprising:
receiving an indication from a second user to create a second event associated with the at least one of the plurality of virtual spaces, wherein creating the second event comprises limiting users that can associate with the second event or limiting communication channels available to users that are associated with the at least one of the plurality of virtual spaces during the second event.

14. The method of claim 10, further comprising:
determining that information indicative of subscribing to any particular virtual space among the plurality of virtual spaces has been received from any particular user among the plurality of users; and
sending an indication of a new event to the any particular user after the new event is added to a calendar of the any particular virtual space.

15. The method of claim 10, further comprising:
receiving a request from a second user to change an attribute of the at least one first event; and
updating the attribute of the at least one first event based on the request from the second user.

16. The method of claim 10, further comprising:
permitting any particular user among the plurality of users to participate in a real-time communication event in any particular virtual space among the plurality of virtual spaces based on determining that the any particular user is associated with the any particular virtual space at any time in a duration of the real-time communication event, wherein an association with the any particular virtual space enables the any particular user to conduct asynchronous real-time communications to other users associated with the any particular virtual spaces.

17. The method of claim 10, further comprising:
causing display of a user schedule associated with the first user, wherein the user schedule indicates a first schedule associated with the plurality of virtual spaces and a second schedule unassociated with the plurality of virtual spaces.

18. A non-transitory computer-readable storage medium, storing computer-readable instructions that upon execution by a computing device cause the computing device to perform operations comprising:
maintaining in at least one database information about a plurality of virtual spaces, wherein a plurality of users share information via the plurality of virtual spaces, wherein the plurality of users and the plurality of virtual spaces are associated with the collaborative work environment;
causing a plurality of cards to be simultaneously displayed on a first computing device associated with a first user, wherein the plurality of cards are representatives of the plurality of virtual spaces, wherein each of the plurality of cards is configured to enable display of an event schedule associated with a corresponding virtual space among the plurality of virtual spaces, and wherein the event schedule indicates one or more events that have taken place, will take place, or are currently taking place in a corresponding virtual space among the plurality of virtual spaces;
sending information associated with the plurality of virtual spaces to the first computing device, wherein the information comprises information indicative of the event schedule; and
causing at least one portion of the information associated with the plurality of virtual spaces to be displayed in the plurality of cards on the first computing device, wherein the at least one portion of the information comprises a time associated with at least one event indicated by the event schedule and information about users associated with at least a subset of the plurality of virtual spaces, wherein the causing at least one portion of the information associated with the plurality of virtual spaces to be displayed in the plurality of cards on the first computing device further comprises:
causing to display the time associated with at least one event indicated by the event schedule inside the one of the plurality of cards, and
cuasing to display the information about the users associated with the at least a subset of the plurality of virtual spaces inside at least a subset of the plurality of cards that re representatives of the at least a subset of the plurality of virtual spaces.

19. The non-transitory computer-readable storage medium of claim 18, wherein the at least one event comprises a plurality of events, and wherein the operations further comprise:
causing information indicative of a first event among the plurality of events to be displayed in at least one card among the plurality of cards; and
causing information indicative of other events among the plurality of events to be displayed in an area adjacent to the at least one card based on a determination that an indication of interest in the at least one virtual space was received from the first computing device, wherein the indication of interest is determined based on first user input received via a first interface on the first computing device.

20. The non-transitory computer-readable storage medium of claim 18, the operations further comprising:
receiving via a second interface on the first computing device information indicative of scheduling a second event in any of the plurality of virtual spaces;
storing the information associated with the second event in the at least one database; and
sending a notification about the second event to at least one subset of other client computing devices associated with at least one subset of other users, wherein the at least one subset of other users have permission to access the plurality of virtual spaces.

* * * * *